US008382574B2

(12) United States Patent
Marks et al.

(10) Patent No.: US 8,382,574 B2
(45) **Date of Patent: *Feb. 26, 2013**

(54) GAMING DEVICE INCLUDING PLAYER SELECTABLE WILD SYMBOLS

(75) Inventors: Daniel M. Marks, Cold Springs, NY (US); Anthony M. Singer, Ramsey, NJ (US); Howard M. Marks, Scarsdale, NY (US)

(73) Assignee: IGT, Reno, NV (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/817,931

(22) Filed: Jun. 17, 2010

(65) Prior Publication Data

US 2010/0273550 A1 Oct. 28, 2010

Related U.S. Application Data

(63) Continuation of application No. 11/018,053, filed on Dec. 21, 2004, now Pat. No. 7,749,071.

(60) Provisional application No. 60/534,042, filed on Jan. 2, 2004.

(51) Int. Cl.
*G06F 9/24* (2006.01)

(52) U.S. Cl. ................................ 463/20; 463/21; 463/25

(58) Field of Classification Search .................... 463/20, 463/21, 25

See application file for complete search history.

(56) References Cited

U.S. PATENT DOCUMENTS

| | | | |
|---|---|---|---|
| 3,642,287 | A | 2/1972 | Lally et al. |
| 3,667,757 | A | 6/1972 | Holmberg |
| 4,448,419 | A | 5/1984 | Telnaes |
| 4,684,600 | A | 8/1987 | Olliges |
| 4,695,053 | A | 9/1987 | Vazquez, Jr. et al. |
| 4,836,553 | A | 6/1989 | Suttle et al. |
| 4,838,552 | A | 6/1989 | Hagiwara |
| 4,861,041 | A | 8/1989 | Jones et al. |

(Continued)

FOREIGN PATENT DOCUMENTS

| | | |
|---|---|---|
| AU | 199717601 B2 | 9/1997 |
| AU | 199717602 B2 | 9/1997 |

(Continued)

OTHER PUBLICATIONS

Classic IGT Game Advertisement, written by IGT, available prior to Aug. 2004.

(Continued)

*Primary Examiner* — Pierre E Elisca

(74) *Attorney, Agent, or Firm* — Neal, Gerber & Eisenberg LLP

(57) ABSTRACT

A gaming system including at least one memory device storing a plurality of instructions. The plurality of instructions, when executed by at least one processor, cause the at least one processor to operate with at least one input device and at least one display device, for a play of a game, to display a plurality of reels, each reel associated with a plurality of symbol display areas. For each reel, the gaming system randomly generates and causes the reel to display one of a plurality of different symbols on the reel at each of the plurality of symbol display areas associated with the reel. If a triggering event occurs, for one of the symbol display areas, the gaming system displays at the symbol display area two of the same symbol which is displayed at said symbol display area, evaluates the symbols displayed at each of the symbol display areas, including the symbol display area at which two of the same symbol are displayed, to determine if any winning symbol combinations are displayed and provide the player any awards associated with any displayed winning symbol combinations.

24 Claims, 18 Drawing Sheets

U.S. PATENT DOCUMENTS

| | | | |
|---|---|---|---|
| 4,991,848 | A | 2/1991 | Greenwood et al. |
| 5,078,405 | A | 1/1992 | Jones et al. |
| 5,098,107 | A | 3/1992 | Boylan et al. |
| 5,152,529 | A | 10/1992 | Okada |
| 5,308,065 | A | 5/1994 | Bridgeman et al. |
| 5,332,228 | A | 7/1994 | Schultz |
| 5,393,061 | A | 2/1995 | Manship et al. |
| 5,423,539 | A | 6/1995 | Nagao |
| 5,431,408 | A | 7/1995 | Adams |
| 5,449,173 | A | 9/1995 | Thomas et al. |
| 5,542,669 | A | 8/1996 | Charron et al. |
| 5,580,053 | A | 12/1996 | Crouch |
| 5,584,764 | A | 12/1996 | Inoue |
| 5,611,535 | A | 3/1997 | Tiberio |
| 5,647,798 | A | 7/1997 | Falciglia |
| 5,720,662 | A | 2/1998 | Holmes, Jr. et al. |
| 5,722,891 | A | 3/1998 | Inoue |
| 5,769,716 | A | 6/1998 | Saffari et al. |
| 5,772,506 | A | 6/1998 | Marks et al. |
| 5,807,172 | A | 9/1998 | Piechowiak |
| 5,816,915 | A | 10/1998 | Kadlic |
| 5,823,873 | A | 10/1998 | Moody |
| 5,833,536 | A | 11/1998 | Davids et al. |
| 5,833,537 | A | 11/1998 | Barrie |
| 5,868,618 | A | 2/1999 | Netley et al. |
| 5,868,619 | A | 2/1999 | Wood et al. |
| 5,882,259 | A | 3/1999 | Holmes, Jr. et al. |
| 5,882,261 | A | 3/1999 | Adams |
| 5,890,962 | A | 4/1999 | Takemoto |
| 5,944,315 | A | 8/1999 | Mostashari |
| 5,980,384 | A | 11/1999 | Barrie |
| 5,984,781 | A | 11/1999 | Sunaga |
| 5,984,782 | A | 11/1999 | Inoue |
| 6,004,207 | A | 12/1999 | Wilson, Jr. et al. |
| 6,007,066 | A | 12/1999 | Moody |
| 6,015,346 | A | 1/2000 | Bennett |
| 6,033,307 | A | 3/2000 | Vancura |
| 6,059,658 | A | 5/2000 | Mangano et al. |
| 6,062,980 | A | 5/2000 | Luciano |
| 6,089,977 | A | 7/2000 | Bennett |
| 6,093,102 | A | 7/2000 | Bennett |
| 6,095,921 | A | 8/2000 | Walker et al. |
| 6,102,798 | A | 8/2000 | Bennett |
| 6,117,009 | A | 9/2000 | Yoseloff |
| 6,120,031 | A | 9/2000 | Adams |
| 6,120,377 | A | 9/2000 | McGinnis, Sr. et al. |
| 6,120,378 | A | 9/2000 | Moody et al. |
| 6,126,542 | A | 10/2000 | Fier |
| 6,142,873 | A | 11/2000 | Weiss et al. |
| 6,149,156 | A | 11/2000 | Feola |
| 6,149,521 | A | 11/2000 | Sanduski |
| 6,155,925 | A | 12/2000 | Giobbi et al. |
| 6,159,095 | A | 12/2000 | Frohm et al. |
| 6,165,070 | A | 12/2000 | Nolte et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas |
| 6,200,217 | B1 | 3/2001 | Osawa |
| 6,220,959 | B1 | 4/2001 | Holmes, Jr. et al. |
| 6,224,483 | B1 | 5/2001 | Mayeroff |
| 6,227,971 | B1 | 5/2001 | Payne et al. |
| 6,231,442 | B1 | 5/2001 | Bennett |
| 6,234,897 | B1 | 5/2001 | Frohm et al. |
| 6,241,607 | B1 | 6/2001 | Bennett |
| 6,251,013 | B1 | 6/2001 | Nagano |
| 6,261,177 | B1 | 7/2001 | Bennett |
| 6,261,178 | B1 | 7/2001 | Weiss |
| 6,299,165 | B1 | 10/2001 | Yoseloff et al. |
| 6,299,170 | B1 | 10/2001 | Yoseloff |
| 6,302,393 | B1 | 10/2001 | Vecchio |
| 6,302,398 | B1 | 10/2001 | Vecchio |
| 6,309,299 | B1 | 10/2001 | Randall et al. |
| 6,309,300 | B1 | 10/2001 | Glavich |
| 6,311,976 | B1 | 11/2001 | Webb |
| 6,315,664 | B1 | 11/2001 | Baerlocher |
| 6,319,124 | B1 | 11/2001 | Baerlocher |
| 6,322,078 | B1 | 11/2001 | Adams |
| 6,322,309 | B1 | 11/2001 | Thomas |
| 6,328,649 | B1 | 12/2001 | Baerlocher et al. |
| 6,336,860 | B1 | 1/2002 | Bennett |
| 6,343,988 | B1 | 2/2002 | Walker |
| 6,358,144 | B1 | 3/2002 | Kaddlic et al. |
| 6,364,767 | B1 | 4/2002 | Brossard |
| 6,375,187 | B1 | 4/2002 | Baerlocher |
| 6,413,162 | B1 | 7/2002 | Baerlocher et al. |
| 6,419,579 | B1 | 7/2002 | Bennett |
| 6,439,993 | B1 | 8/2002 | O'Halloran |
| 6,439,995 | B1 | 8/2002 | Hughes-Baird |
| 6,454,266 | B1 | 9/2002 | Breeding et al. |
| 6,464,582 | B1 | 10/2002 | Baerlocher |
| 6,494,454 | B2 | 12/2002 | Adams |
| 6,506,118 | B1 | 1/2003 | Baerlocher |
| 6,517,432 | B1 | 2/2003 | Jafe |
| 6,533,658 | B1 | 3/2003 | Walker et al. |
| 6,544,120 | B2 | 4/2003 | Ainsworth |
| 6,547,242 | B1 | 4/2003 | Sugiyama et al. |
| 6,558,254 | B2 | 5/2003 | Baelocher |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,612,575 | B1 | 9/2003 | Cole et al. |
| 6,616,142 | B2 | 9/2003 | Adams |
| 6,632,140 | B2 | 10/2003 | Berman et al. |
| 6,634,945 | B2 | 10/2003 | Glavich et al. |
| 6,726,204 | B2 | 4/2004 | Inoue |
| 6,866,583 | B2 | 3/2005 | Glavich et al. |
| 6,880,826 | B2 | 4/2005 | Inoue |
| 6,910,962 | B2 | 6/2005 | Marks et al. |
| 6,921,335 | B2 | 7/2005 | Rodgers et al. |
| 6,960,133 | B1 | 11/2005 | Marks et al. |
| 7,001,274 | B2 | 2/2006 | Baerlocher et al. |
| 7,014,560 | B2 | 3/2006 | Glavich et al. |
| 7,056,213 | B2 | 6/2006 | Ching et al. |
| 7,070,502 | B1 | 7/2006 | Bussick et al. |
| 7,226,359 | B2 | 6/2007 | Bussick et al. |
| 2002/0072402 | A1 | 6/2002 | Baerlocher |
| 2002/0142822 | A1 | 10/2002 | Baerlocher et al. |
| 2002/0183109 | A1 | 12/2002 | McGahn et al. |
| 2003/0027623 | A1 | 2/2003 | Rose |
| 2003/0040360 | A1 | 2/2003 | Kaminkow |
| 2003/0073480 | A1 | 4/2003 | Thomas et al. |
| 2003/0078093 | A1 | 4/2003 | Simms et al. |
| 2003/0078096 | A1 | 4/2003 | Kaminkow et al. |
| 2003/0119583 | A1 | 6/2003 | Kaminkow et al. |
| 2003/0162578 | A1 | 8/2003 | Baerlocher |
| 2003/0162579 | A1 | 8/2003 | Gauselmann |
| 2003/0162584 | A1 | 8/2003 | Hughs-Baird et al. |
| 2003/0195027 | A1 | 10/2003 | Baerlocher et al. |
| 2003/0203752 | A1 | 10/2003 | Kaminkow et al. |
| 2003/0203753 | A1 | 10/2003 | Meyer et al. |
| 2003/0216165 | A1 | 11/2003 | Singer et al. |
| 2003/0224850 | A1 | 12/2003 | Anderson et al. |
| 2004/0012145 | A1 | 1/2004 | Inoue |
| 2004/0048650 | A1 | 3/2004 | Mierau et al. |
| 2004/0058722 | A1 | 3/2004 | Yang et al. |
| 2004/0058727 | A1 | 3/2004 | Marks et al. |
| 2004/0192431 | A1 | 9/2004 | Singer et al. |
| 2004/0195773 | A1 | 10/2004 | Masci et al. |
| 2004/0242313 | A1 | 12/2004 | Munoz |
| 2006/0025210 | A1 | 2/2006 | Johnson |
| 2011/0136565 | A1* | 6/2011 | Low ................................ 463/20 |
| 2011/0256920 | A1* | 10/2011 | Belger et al. .................... 463/20 |
| 2011/0287825 | A1* | 11/2011 | Hoover ........................... 463/20 |
| 2012/0108317 | A1* | 5/2012 | Caputo et al. ................... 463/20 |
| 2012/0122540 | A1* | 5/2012 | Meyer ............................. 463/19 |
| 2012/0122541 | A1* | 5/2012 | Meyer ............................. 463/19 |
| 2012/0172106 | A1* | 7/2012 | Caputo et al. ................... 463/20 |
| 2012/0202579 | A1* | 8/2012 | Olsen .............................. 463/20 |
| 2012/0252562 | A1* | 10/2012 | Aoki ............................... 463/25 |

FOREIGN PATENT DOCUMENTS

| | | | |
|---|---|---|---|
| AU | 722969 | | 6/1998 |
| AU | 199717318 | A1 | 9/1999 |
| AU | 199917318 | A1 | 9/1999 |
| EP | 0 060 019 | A1 | 9/1982 |

| | | | |
|---|---|---|---|
| EP | 0 945 837 | A2 | 9/1999 |
| EP | 0984408 | A2 | 3/2000 |
| EP | 1544811 | | 6/2005 |
| GB | 2 084 371 | A | 4/1982 |
| GB | 2097160 | | 10/1982 |
| GB | 2 101 380 | A | 1/1983 |
| GB | 2 222 712 | A | 3/1990 |
| GB | 2384097 | | 7/2003 |
| WO | WO 9732285 | | 9/1997 |
| WO | WO 0012186 | | 3/2000 |
| WO | WO 00/66235 | | 11/2000 |
| WO | WO 00/76606 | A1 | 12/2000 |
| WO | WO 2005010831 | | 2/2005 |

OTHER PUBLICATIONS

Wild Streak Advertisement, written by WMS Gaming, Inc., published in 2001.
Penguin Pays Advertisement, written by Aristocrat Incorporated, published in 1998, on or before December thereof.
Black Swan Paytable Display, written by IGT, published prior to 2001.
Jackpot Party Brochure and Articles, written by WMS Gaming, Inc., published in 1988.
Enchanted Unicorn Advertisement, written by IGT, published in 2001, on or before December thereof.
Introducing “Smiling Ape” Machine Advertisement (including Joker’s Wild Poker description), written by IGT, published prior to Jan. 2002.
Description of Symbol Feature in Australian UFO Gaming Machine, written by Barcrest Ltd., published in 1995.
REEL MAGIC™ Gaming Machine Description, written by IGT, available in 1986.
ENCHANTED FOREST™ Gaming Description, written by Aristocrat, available in 1994, on or before December thereof.
Happy Camper Advertisement, written by IGT, published in 2001, on or before December thereof.
Fishin’ Buddies Article, written by Strictly Slots/Anchor Games, published in Apr. 2001.
Boot Scootin Article, written by Strictly Slots/Aristocrat Leisure Industries, PTY Ltd., published in Apr. 2001.
Little Green Men, Jr. Advertisement written by A.C. Coin and Slots Services Company, published prior to Jan. 2003.
Cash Chameleon Article, written by Strictly Slots/Aristocrat Leisure Industries, PTY Ltd., published in 2001.
Loco Loot Article, written by Strictly Slots/Aristocrat Leisure Industries, PTY Ltd., published in May 2002.
Mountain Money Article, written by Strictly Slots/Aristocrat Leisure Industries, PTY Ltd., published in Jun. 2002.
Break the Spell, Article written by Strictly Slots/Aristocrat Casino Technology, Ltd., published in Sep. 2000.
Break the Spell Web Pages, written by Atronic Americas LLC, printed on Jan. 15, 2001.
Break the Spell Brochure, published in 1999.
Double Diamond Line Advertisement, written by Bally Gaming Systems, published in 2000.
Cossack Dance Advertisement, written by Olympic Video Gaming, published prior to 2003.
Battleship Advertisement, written by Mikohn, published in 2003.
Battleship Article, written by Strictly Slots, published in Sep. 2000.
Break the Spell Advertisement, written by Atronic Casino Technology, Ltd., published in 1999, on or before December thereof.
A Salute to Game Shows—The Price is Right—Pricing Game from http://schuminweb.com/game-shows/shows/price-is-right/priching-games.htm, printed on Mar. 16, 2001.
A Salute to Game Shows—The Price is Right—Showcase Showdowns from http://shuminweb.com/game-shows/shows/price-is-right/price-is-right/showcase-showdowns.htm, printed on Mar. 16, 2001.
The Basics of Winning Video Poker (Chapter VI Deuces Wild & Chapter VII Jokers Wild) written by J. Edward Allen, published in 1990.
Who Dunnit Advertisement, written by WMS Gaming, Inc., published Jun. 26, 2001.
Wild Streak Article written by Strictly Slots, published in Mar. 2001.
Who Dunnit? Brochure, written by WMS Gaming Inc., available prior to Jan. 2004.

* cited by examiner

FIG. 3B 114 116 113

| SYMBOL COMBINATION | AWARD |
|---|---|
| A-A-A-A-A | 1,000 |
| B-B-B-B-B | 500 |
| C-C-C-C-C | 250 |
| D-D-D-D-D | 150 |
| E-E-E-E-E | 125 |
| F-F-F-F-F | 100 |
| G-G-G-G-G | 90 |
| A-A-A-A | 80 |
| B-B-B-B | 75 |
| C-C-C-C | 70 |
| D-D-D-D | 60 |
| E-E-E-E | 50 |
| F-F-F-F | 40 |
| G-G-G-G | 30 |
| A-A-A | 25 |
| B-B-B | 20 |
| C-C-C | 15 |
| D-D-D | 10 |
| E-E-E | 10 |
| F-F-F | 5 |
| G-G-G | 5 |

GAMING DEVICE INCLUDING PLAYER SELECTABLE WILD SYMBOLS

CROSS REFERENCES TO RELATED APPLICATIONS

This application is a continuation of and claims priority to non-provisional patent application Ser. No. 11/018,053, filed on Dec. 21, 2004 , which claims priority to provisional patent application No. 60/534,042, filed on Jan. 2, 2004, the entire contents of each these applications being incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

To play a conventional slot machine, a player deposits money in the form of coins, gaming tokens, paper currency or tickets either into a coin slot or bill acceptor, respectively. The coins and gaming tokens are collected in a reservoir inside the gaming machine while the paper currency or ticket is collected in the bill acceptor inside the gaming machine. If the coins, gaming tokens, paper currency or ticket are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits to wager on the next spin of the slot reels. The player causes the gaming device to spin the reels by pressing the spin button or by pulling a handle. When the reels stop spinning, symbols are displayed on the reels at symbol positions. Outcomes or awards, if any, are provided to a player based on designated symbol combinations indicated in a paytable or award summary table.

More specifically, many conventional slot machines include a symbol matrix which includes symbols displayed on three or more of the reels (also called “columns” or “reel columns”) that are adjacent to each other. The resulting matrix of symbols typically ranges from three columns by three rows with nine total symbols, to five columns by three rows with fifteen total symbols. Each position in the symbol matrix is referenced by column, from left to right, and row, from the top to bottom (“symbol positions”). For example: symbol position 1/2 is located in column 1 and row 2. Players collect credits for predetermined winning symbol combinations on the reels that appear in specific or designated symbol positions. The combination of these designated symbol positions are generally referred to as “paylines.”

Conventional gaming devices employ different symbols to form different winning symbol combinations in a game. Conventional gaming devices also employ different symbols which perform a function in a game. One such symbol is a wild symbol or wild card. Wild symbols provide a player with an additional opportunity to obtain winning combinations. Wild symbols, wild cards and wild indicators in gaming devices also provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for or functions as a heart and provides the player with that combination.

Known slot machine games include wild symbols placed on the reel strips, with each wild symbol substituting for all line pay symbols.

Known slot machine games include wild symbols placed on the reel strips, with each wild symbol substituting for some line pay symbols.

Known slot machine games include wild symbols placed on the reel strips, with each wild symbol expanding to all positions on the slot reel and substituting for all line pay symbols.

U.S. Pat. No. 6,089,977 discloses a slot machine game including wild symbols placed on the reel strips, where a wild symbol substitutes for all symbols and, upon a trigger event, moves to each position in the symbol matrix.

U.S. Pat. No. 6,517,432 discloses a slot machine game including wild symbols placed on the reel strips, where each wild symbol substitutes for all symbols and, upon a trigger event, moves to a random number of positions in the symbol matrix.

These conventional slot machines generate wild symbols based on fixed rules where all of the symbols are generated and displayed in a symbol matrix by the slot machine. These slot machines do not provide a random generation of wild symbols based on one or more decisions by a player.

There is a need for new gaming devices including new gaming machines which increase a player’s chances for obtaining winning symbol combinations in a game.

SUMMARY

One embodiment of the present invention is directed to a gaming device (and method of operating a gaming device) including a plurality of symbol generators such as reels which generate a plurality of player selectable symbols in a game (such as a bonus game) which each reveal a value or a wild symbol when a player picks the selectable symbols in a play of the game. The player’s decision to pick each selectable symbol in the game affects the number and/or location of wild symbols in the game. For example, the player’s decisions may cause the second, third and fourth reels of a set of five reels to display wild symbols and thereby enhance the player’s chances of obtaining a winning outcome such as an award in the game.

In one embodiment, the game is triggered by a triggering event such as an occurrence of one or more designated trigger symbols appearing any where on reels two, three and four in a primary or base game. After the triggering event occurs in the primary or base game, the gaming device initiates a bonus game and causes a plurality or all of the displayed symbols on reels two, three and four to be replaced with or changed to bonus game symbols or selectable symbols.

In the bonus game, the gaming device enables the player to select or pick one of the selectable symbols on reel two. The selected symbol transforms and reveals either a value symbol or a wild symbol. The selection of a value symbol provides the player with an outcome such as a value or an award equal to an amount associated with the value symbol. The bonus game ends and the gaming device provides the value or award to the player in the bonus game. If the picked selectable symbols reveals a wild symbol, the gaming device replaces or changes one, a plurality or all of the displayed symbols on that reel into wild symbols and the bonus game continues.

If the game continues, the gaming device enables the player to select or pick one of the selectable symbols on reel three. If the picked selectable symbol reveals a value symbol, the gaming device provides the award associated with the value symbol to the player and the bonus game ends. If the picked selectable symbol is a wild symbol, the gaming device replaces or changes one, a plurality or all of the displayed symbols on that reel into wild symbols and the bonus game continues. The gaming device now displays two reels with wild symbols in the bonus game.

If the bonus game continues, the gaming device enables the player to select or pick one of the selectable symbols on reel four. If the picked selectable symbol reveals a value symbol, the gaming device provides the award associated with the value symbol to the player and the bonus game ends. If the picked selectable symbol is a wild symbol, the gaming device replaces or changes one, a plurality or all of the displayed symbols on that reel into wild symbols. The gaming device then evaluates the symbols on the reels including the wild symbols which are indicated by the activated or wagered on paylines to determine if any winning symbol combinations are indicated by the activated paylines. The gaming device provides any outcomes or awards associated with winning symbol combinations indicated by the activated paylines associated with the reels. The gaming device also provides any values or awards associated with revealed value symbols to the player in the bonus game.

In alternative embodiments, the gaming device re-spins one, a plurality or all of the reels which do not include the wild symbols to form new symbol combinations in a play of the game. In these embodiments, the gaming device evaluates the symbol combinations indicated by the activated or wagered on paylines after re-spinning the reels. The gaming device then provides the player with any outcomes or awards associated with the symbol combinations indicated by the activated paylines.

As described above, the selectable symbols including the value symbols and the wild symbols provide new winning symbol combinations in the bonus game and thereby enhance a player's chances of obtaining several awards in the bonus game and potentially a very large award in the bonus game.

It is therefore an advantage of the present invention to provide a gaming device having a player selectable symbols that reveal one or more wild symbols or values in a game.

Additional features and advantages of the present invention are described in, and will be apparent from, the following Detailed Description of the Invention and the figures.

Additional features and advantages are described herein, and will be apparent from the following Detailed Description and the figures.

BRIEF DESCRIPTION OF THE FIGURES

FIG. 3B is a paytable illustrating different symbol combinations occurring on the reels and the awards associated with the symbol combinations.

DETAILED DESCRIPTION

Figure 1A:
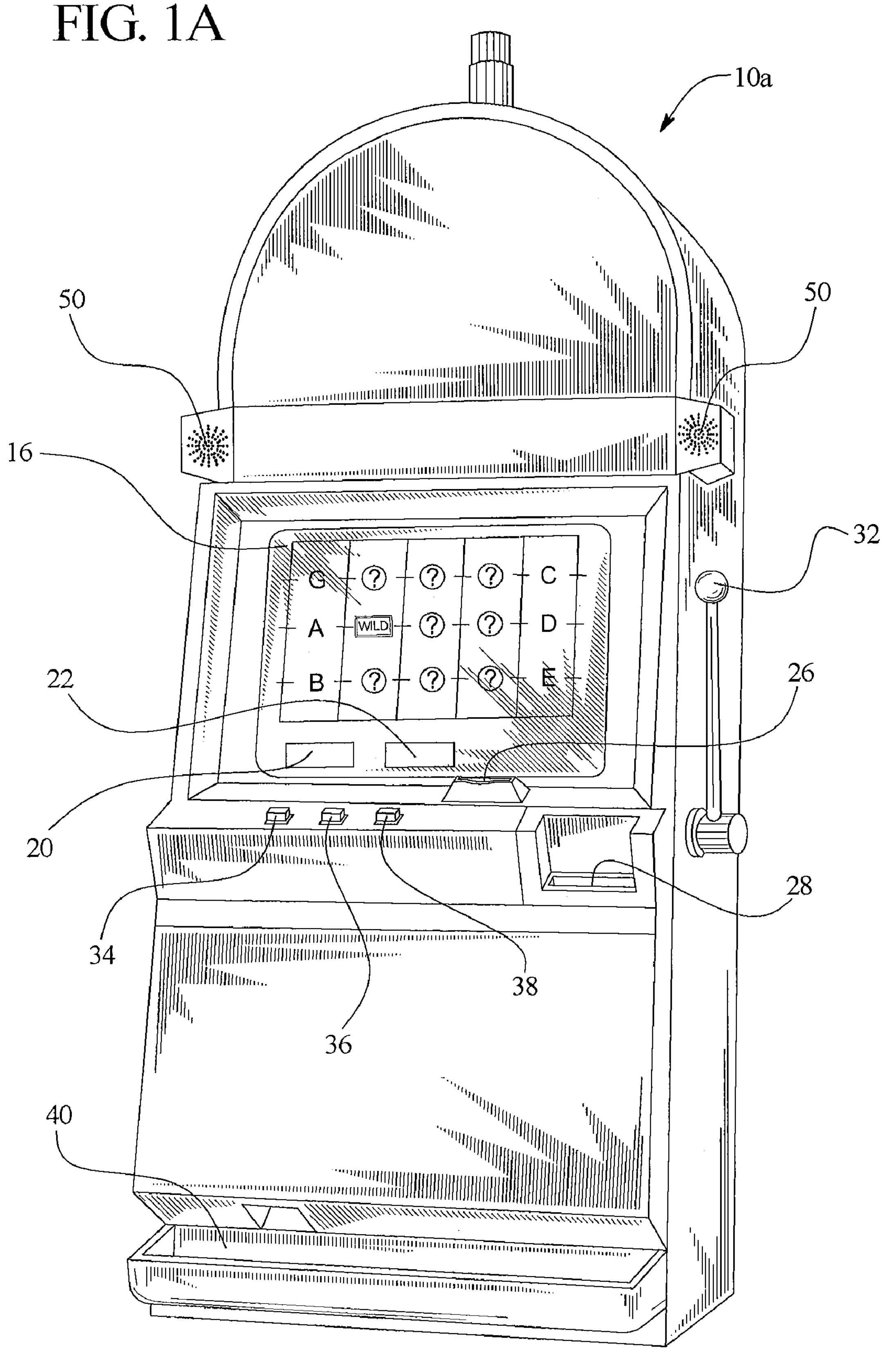
FIG. 1A is a front perspective view of one embodiment of the gaming device of the present invention.
Figure 1B:
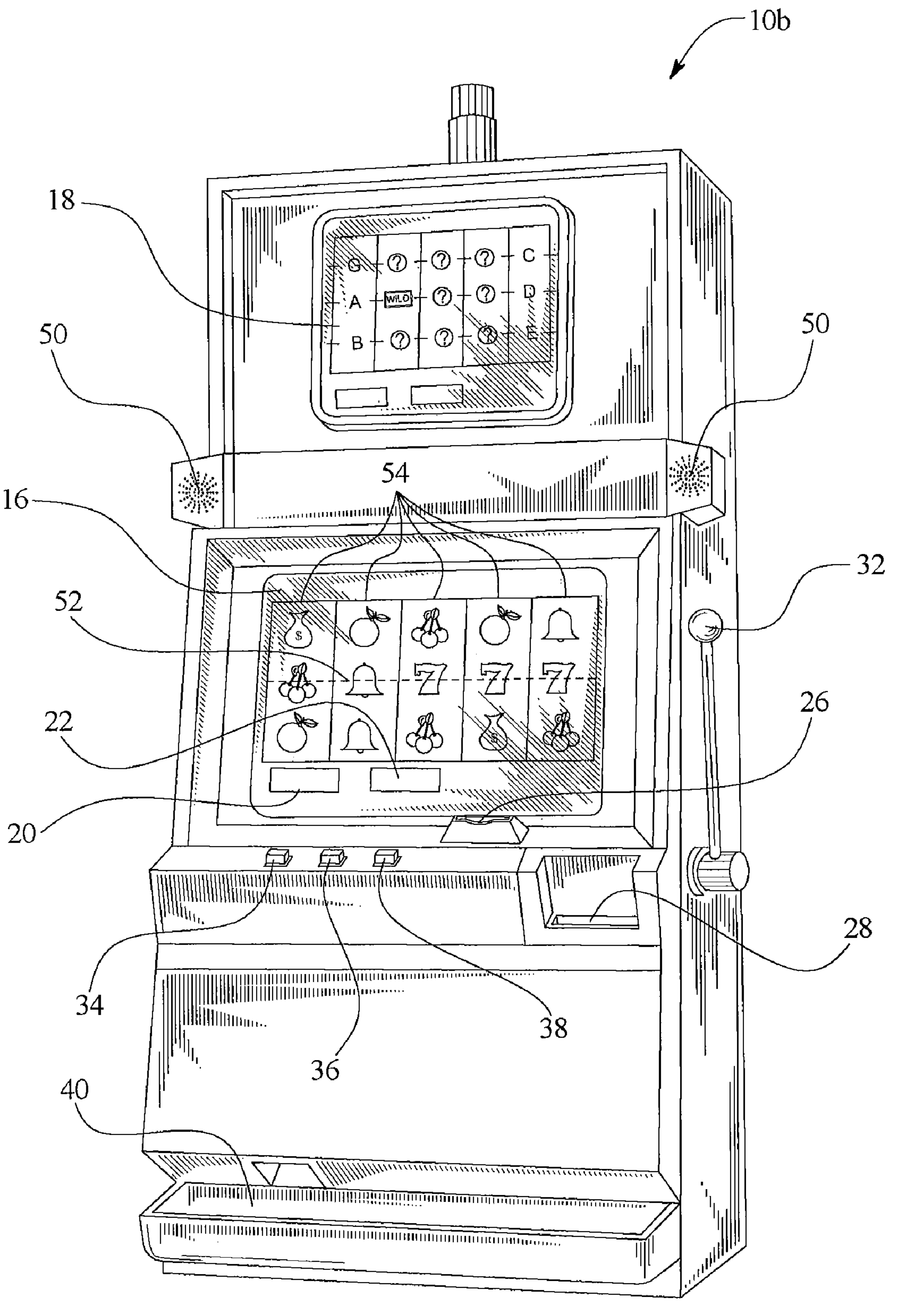
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
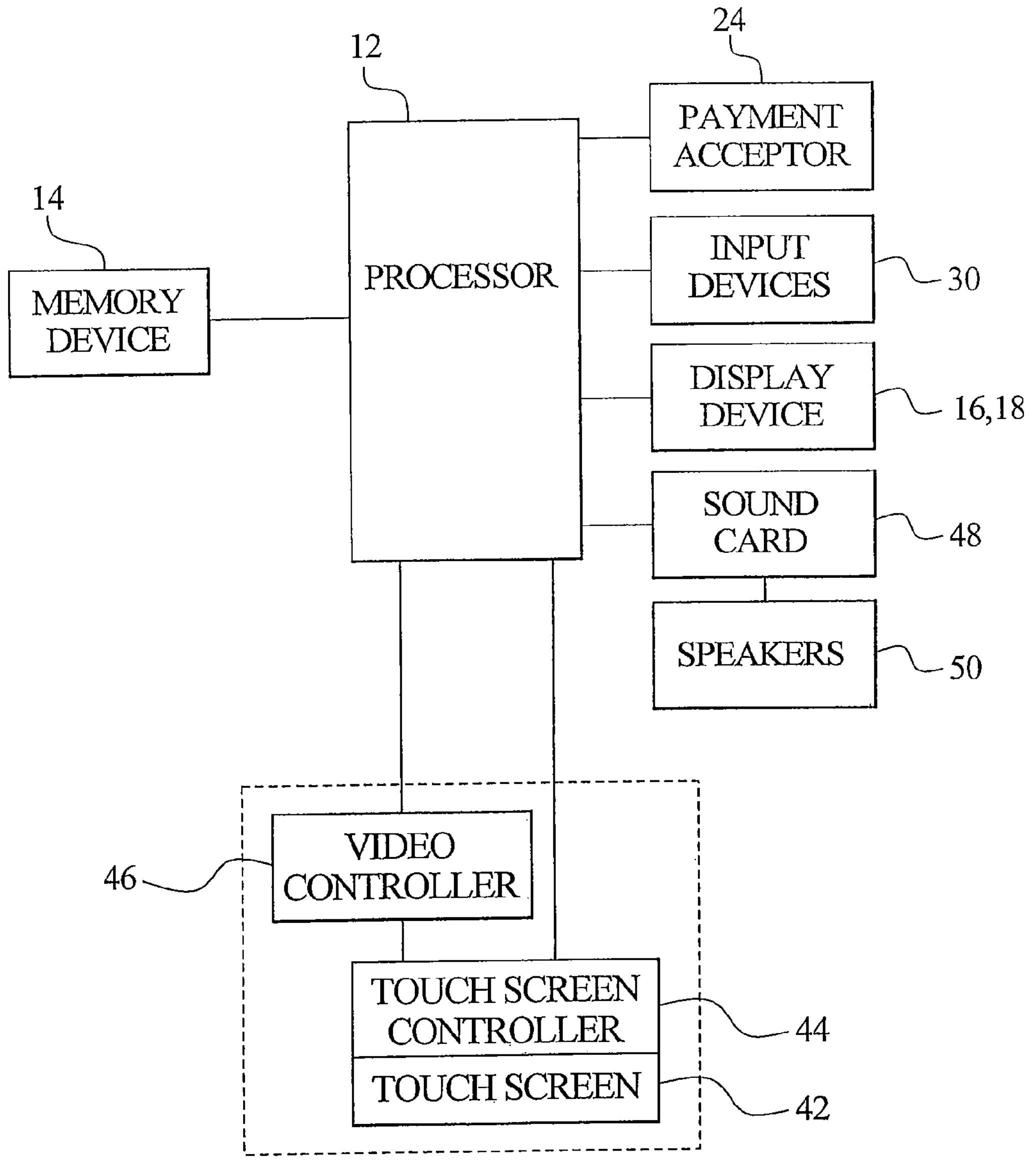
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game susceptible to representation in an electronic or electromechanical form which produces a random outcome based on probability data upon activation from a wager.

In one embodiment, as illustrated in FIGS. 1A and 1B, a base or primary game is a slot game with a plurality of separate paylines 52. The paylines may be horizontal, vertical, circular, diagonal, angled or any combination thereof. In this embodiment, the gaming device displays at least one and preferably a plurality of reels 54, such as three to five reels 54 in video form with simulated reels and movement thereof. In one embodiment, an electromechanical slot machine includes a plurality of adjacent, rotatable wheels which may be combined and operably coupled with an electronic display of any suitable type. In another embodiment, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
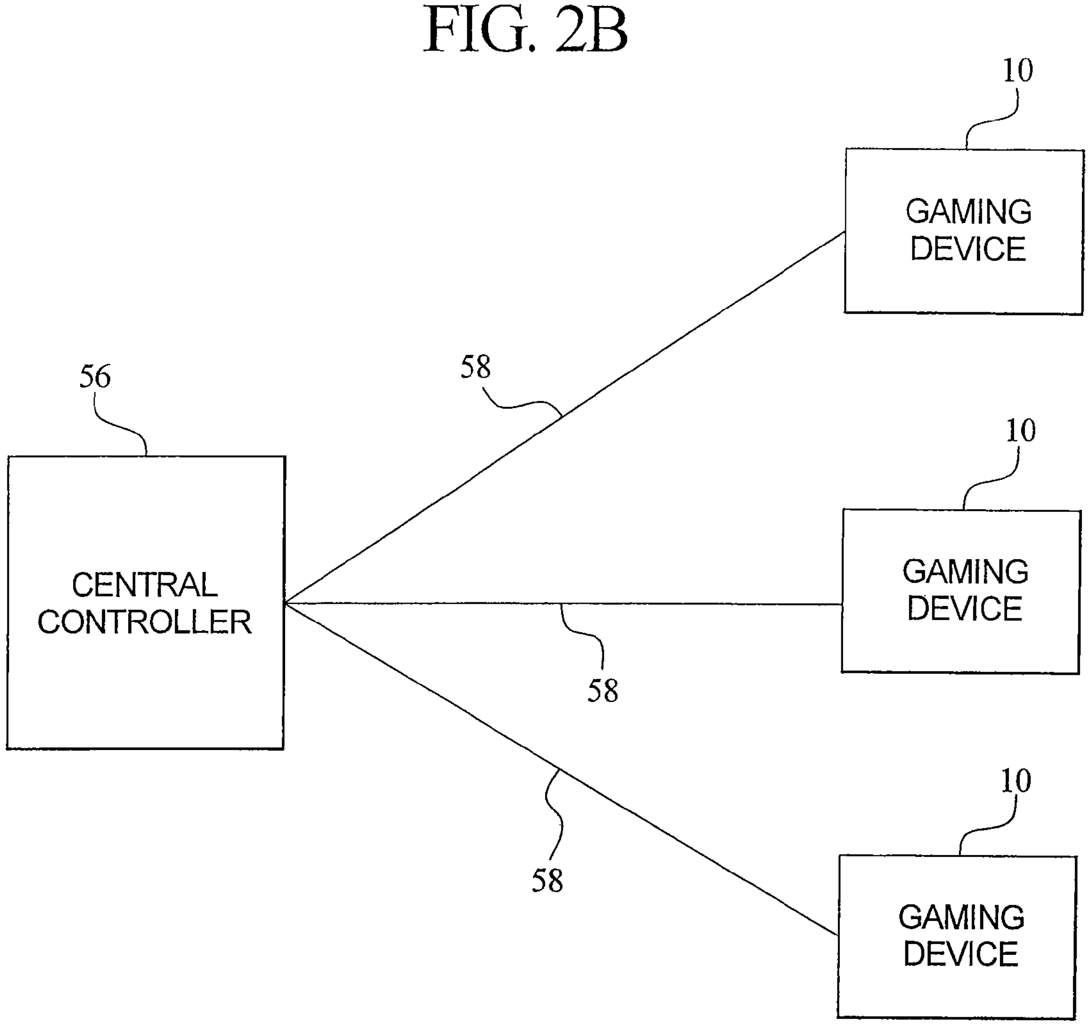
FIG. 2B is a schematic block diagram illustrating a plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Player Selectable Wild Symbols

One embodiment of the present invention is directed to a gaming device that enables a player to pick or select one or more selectable symbols in a game after a triggering event occurs in a primary game to reveal a value symbol or a wild symbol. The wild symbol increases a player's chances of obtaining a winning symbol combination in a game and potentially a larger outcome or award in the game. The value symbol provides an outcome such as an award to the player and in one embodiment, ends the game.\

Referring now to FIGS. 3A to 3K, an example of one embodiment of a gaming device of the present invention is illustrated where the gaming device includes a symbol matrix including a plurality of symbol generators such as reels 54*a*, 54*b*, 54*c*, 54*d* and 54*e*. Each symbol generator or reel 54 includes a plurality of symbols 100 thereon. The symbols include at least one designated symbol such as trigger symbols 102*a*, 102*b* and 102*c* on reels 54*b*, 54*c* and 54*d*, respectively. It should be appreciated that one, a plurality or all of the reels may include one or a plurality of the trigger symbols in a game. In the illustrated example, the trigger symbols are in the shape of a star. It should be appreciated that the trigger symbol may be any suitable size, shape, symbol, character or image.

A plurality of paylines 52*a*, 52*b* and 52*c* are associated with the reels. Each payline includes one symbol position from each of the five reels 54*a*, 54*b*, 54*c*, 54*d* and 54*e*. For the purposes of this application, symbol positions are identified by column, from left to right, and by row, from top to bottom. For example, symbol position 1/1 is located in the leftmost column, topmost row. It should be appreciated that additional paylines may be associated with the reels. It should also be appreciated that any of the paylines may include one or more of the same symbol positions. In this embodiment, payline one or payline 52*a* includes symbol positions: 1/2, 2/2, 3/2, 4/2, 5/2. Payline two or payline 52*b* includes symbol positions: 1/1, 2/1, 3/1, 4/1, 5/1. Payline three or payline 52*c* includes 1/3, 2/3, 3/3, 4/3, 5/3. Alternatively, the game may define any suitable number of paylines including any suitable number of symbol positions, paylines using any location of symbol positions, and/or any order of payline activation.

Figure 3A:
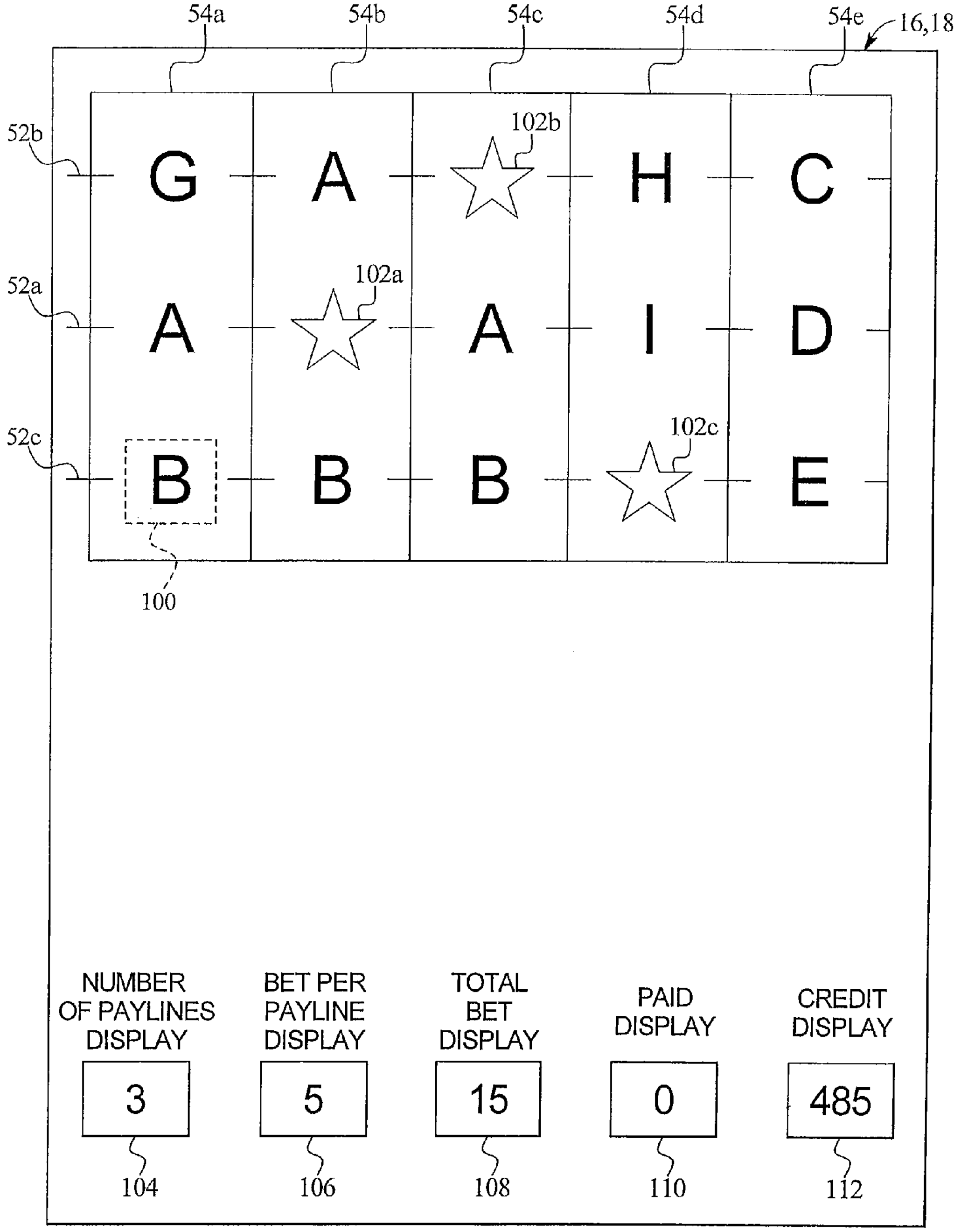
FIG. 3A is an enlarged elevation view of one embodiment of the gaming device of the present invention illustrating a triggering event in the primary game.

As illustrated in FIG. 3A, the gaming device also includes a plurality of meters or displays to provide or indicate information to a player in a game such as a number of paylines display 104, a bet per payline display 106, a total bet display 108, a paid display 110 and a credit display 112. The number of paylines display 104 indicates the number of paylines wagered on by a player in a play of the game. The bet per payline display indicates the wager made by the player on each of the paylines. The total bet display 108 indicates the total bet made by the player in the play of the game. The total bet equals the number of paylines wagered on in the play of the game as indicated by the number of paylines display 104 multiplied by the bet per payline indicated by the bet per payline display 106. The paid display 110 indicates the outcome or award paid to the player in that play of the game. The credit display 112 indicates the total accumulated number of credits for the player. It should be appreciated that any suitable meters or displays may be provided in a game.

In this embodiment, the primary or base game provides, outcomes or awards for line pay symbol combinations. It should be appreciated that the gaming device may provide an outcome or award for any suitable symbol combination including line pay symbol combinations, scatter pay combinations or any other suitable symbol combination. A line pay combination provides an outcome or award for symbol combinations including the same symbols appearing adjacent on a single payline such as starting from the leftmost position on the payline. Symbols that combine to form line pays may be called line pay symbols. For example, four "A" line pay symbols (i.e. A-A-A-A-C) on a selected payline provides an award to the player but the symbol combination of A-A-B-A-A does not. Reel scatter pays provide outcomes or awards for any combination of the same symbols appearing anywhere on the reels. Symbols that combine to form scatter pays are called scatter pay symbols. For example, any three C symbols anywhere on the reels provides an award to the player in a play of the game.

The gaming device provides awards to a player based on a pay schedule or paytable such as paytable 113 illustrated in FIG. 3B. In FIG. 3B, the paytable 113 includes a column 114 having a plurality of symbol combinations and a column 116 which indicates the outcomes or awards associated with each of the symbol combinations. The gaming device provides the award in column 116 to the player for each occurrence of the corresponding symbol combination on the reels in a play of a game. Although the paytable 113 illustrates fixed outcomes, payouts or awards, it should be appreciated that any suitable outcome may be provided to the player.

It should be appreciated that the pay schedules or pay tables may provide outcomes or awards for any suitable number of the same or different symbols, with such symbols appearing in any order and/or in any location on a payline or on the symbol matrix or reels. Furthermore, the pay table may provide any suitable type or amount of award, including: credits, such as a fixed number of credits or a range of credits, or random amount of credits; a bonus feature, such as a multiplicative factor for credits won; one or more free spins of the reels, with or without an enhanced pay schedule; cash, products, services; any other award of value; and/or any combination of awards; free games, a modifier or any other suitable outcomes or awards.

Referring to FIG. 3A, the gaming device provides a primary or base game including a plurality of reels such as reels 54*a*, 54*b*, 54*c*, 54*d* and 54*e* as described above. When a triggering event occurs in the primary game, the gaming device initiates a secondary or bonus game. The triggering event may be a designated number of symbols appearing on the reels or any other suitable triggering event. In FIG. 3A, the triggering event includes three trigger symbols appearing or occurring on the reels in a play of the game. Specifically, three trigger symbols 102*a*, 102*b* and 102*c* occurred on reels 54*b*, 54*c* and 54*d*, respectively. Therefore, the triggering event initiates or activates the secondary or bonus game in this play of the game. Also as shown in FIG. 3A, the player placed a wager to activate three paylines in the play of the game as indicated by the number of paylines display 104. The player also made a wager or bet five credits on each payline as indicated by the bet per payline display 106. Thus, the player's total bet in this play of the game is fifteen as indicated by the total bet display 108. The player has not received any outcomes or awards in the game as indicated by the paid display 110. The player's total bet or wager of fifteen is subtracted from the player's total number of credits or bet in the game of five-hundred to give the player a new total number of credits of four-hundred eighty-five as indicated by the credit meter or credit display 112.

Figure 3C:
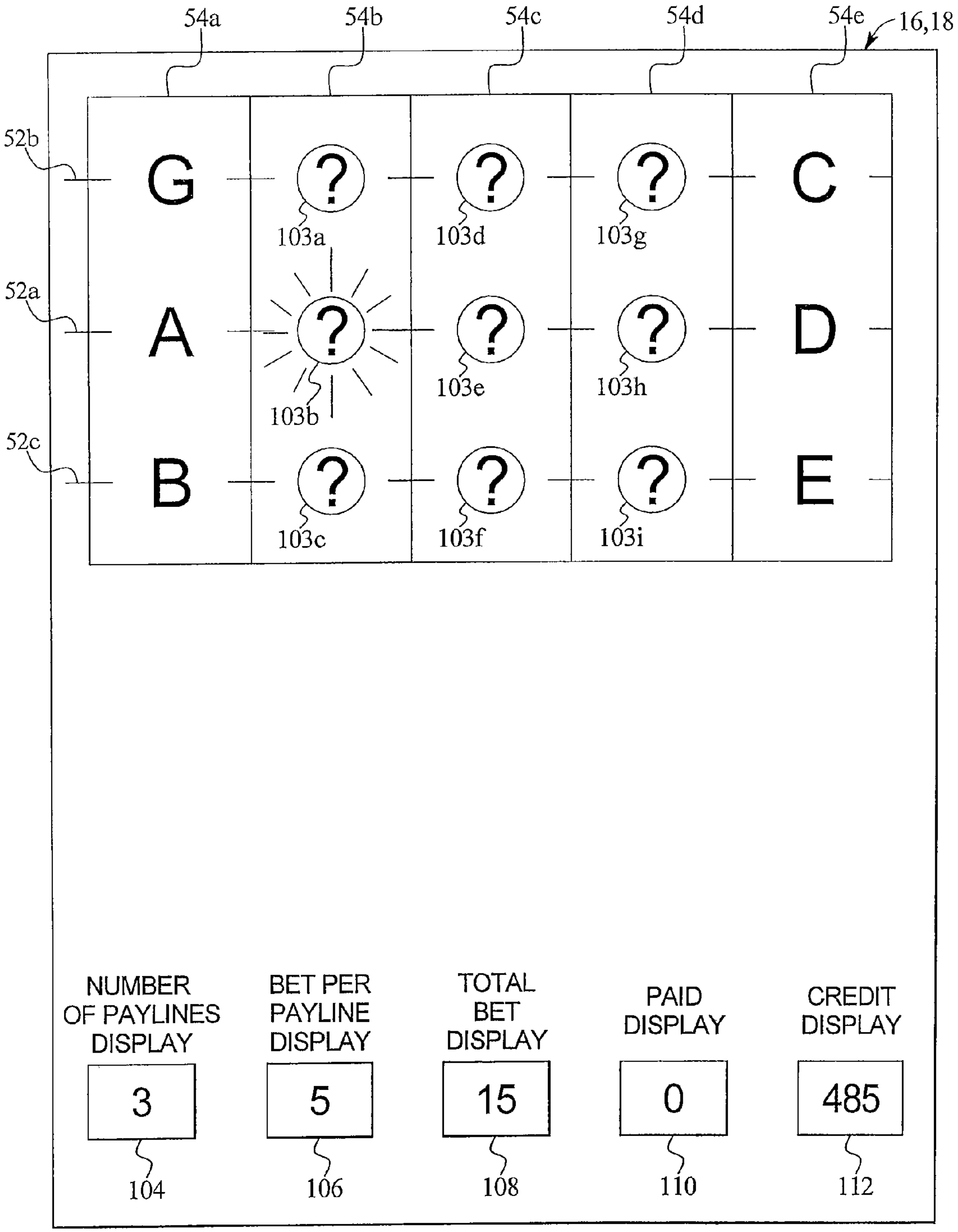
FIGS. 3C, 3D, 3E, 3F, 3G, 3H, 3I, 3J and 3K are enlarged elevation views of the embodiment of FIG. 3A illustrating an example of one embodiment of the bonus game initiated when the triggering event occurs in the primary game.

In the secondary or bonus game, the gaming device generates wild symbols based upon one or more player decisions in the game. As illustrated in FIG. 3C, after the triggering event occurs, the gaming device replaces or transforms each of the symbols shown on the reels including the trigger symbols 102*a*, 102*b* and 102*c* with selectable symbols or wild guess symbols 103*a*, 103*b*, 103*c*, 103*d*, 103*e*, 103*f*, 103*g*, 103*h* and 103*i*. The gaming device enables the player to select or pick at least one of the selectable symbols 103 on each of the reels including the selectable symbols in the bonus game. In the illustrated example, the gaming device enables the player to sequentially pick one of the selectable symbols on each of the reels 54*a*, 54*b* and 54*c* until a termination event. It should be appreciated that the gaming device may enable the player to pick one, a plurality or all of the selectable symbols on the reels including the selectable symbols, a designated number of the selectable symbols on the reels, certain of the selectable symbols on the reels or any suitable number of the selectable symbols.

In the illustrated example, the gaming device waits for the player's decision on which of the selectable symbols the player will pick on reel 54*b* in the bonus game. In this embodiment, if the player does not make a decision within a designated period of time such as a few seconds, the gaming device displays an indicator such as a message "Pick A Symbol" on the same or a separate display and/or play a "Pick A Symbol" audio recording to prompt the player's decision. It should be appreciated that the gaming device may indicate or otherwise prompt the player to make a decision in the game using any suitable prompt, signal, message or indicator.

With each decision, the player may select one of the selectable symbols and reveal either a credit value symbol or a wild symbol. As a result, the player's decisions can lead to four possible scenarios. In scenario #1, the player's symbol selection on reel two reveals a credit value symbol or value. The gaming device evaluates the symbol combinations indicated by the reels and provides any additional awards to the player based on the indicated symbol combinations. The gaming device provides the value and/or the awards to the player and the bonus game ends.

In scenario #2, the player selects a selectable symbol on reel two which reveals a wild symbol followed by the selection of a selectable symbol on reel three which reveals a value symbol. The gaming device evaluates the symbol combinations indicated by the reels and provides any additional awards to the player based on the indicated symbol combinations. The gaming device provides the value and/or the awards to the player and the bonus game ends.

In scenario #3, the player selects a selectable symbol which reveals a wild symbol on reel two, followed by the selection of a selectable symbol on reel three which reveals a wild symbol, followed by a selectable symbol on reel four which reveals a credit value or value symbol. The gaming device evaluates the symbol combinations indicated by the reels and provides any additional awards to the player based on the indicated symbol combinations. The gaming device then provides the value and/or the awards to the player and the bonus game ends.

In scenario #4, the player selects a selectable symbol on reel two which reveals a wild symbol, selects a selectable symbol on reel three which reveals a wild symbol and selects a selectable symbol on reel four which also reveals a wild symbol. The gaming device evaluates the symbol combinations indicated by the reels and provides any additional awards to the player based on the indicated symbol combinations. The gaming device then provides the value and/or the awards to the player and the bonus game ends.

In one embodiment, by including one wild symbol and two value symbols on each reel, the probability of each scenario is: 2/3 (66.67%) for scenario #1, 2/9 (22.22%) for scenario #2, 2/27 (7.41%) for scenario #3 and 1/27 (3.70%) for scenario #4. Under any of the above scenarios, however, the gaming device provides at least one value to the player in the bonus game.

As described above, in scenarios #1 and 2, the player will receive a minimum award including the credits shown or indicated by the credit value symbol or value symbol. In scenario #3, the player receives a minimum award of credits based on the credit value symbol and three symbol line pays on paylines 52*a*, 52*b* and 52*c*. In scenario #4, the player receives awards for five symbol line pays on all of the paylines.

Figure 3D:
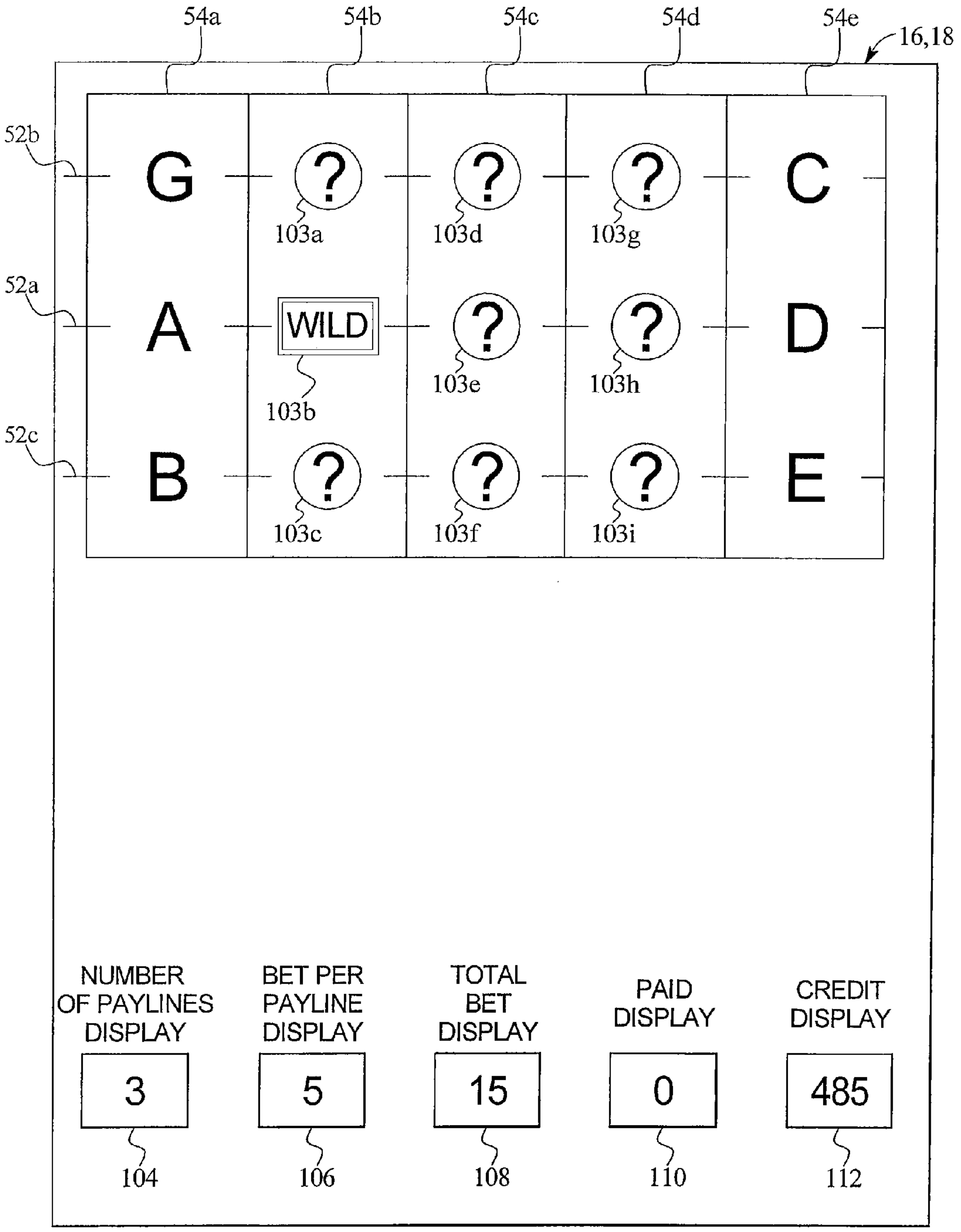

The following example illustrated in FIGS. 3A to 3K depicts scenario #3, with a probability of 2/27 (7.41%), in which the player selects a plurality of selectable symbols which reveals wild symbols on reels 54*b* and 54*c*, and then selects a selectable symbol on reel 54*d* which reveals a value symbol. As illustrated in FIG. 3C, the player selects selectable symbol 103*b* located in the middle symbol position or symbol position 2/2 of reel 54*b*. The selected symbol reveals wild symbol 102*d* as illustrated in FIG. 3D.

Figure 3E:
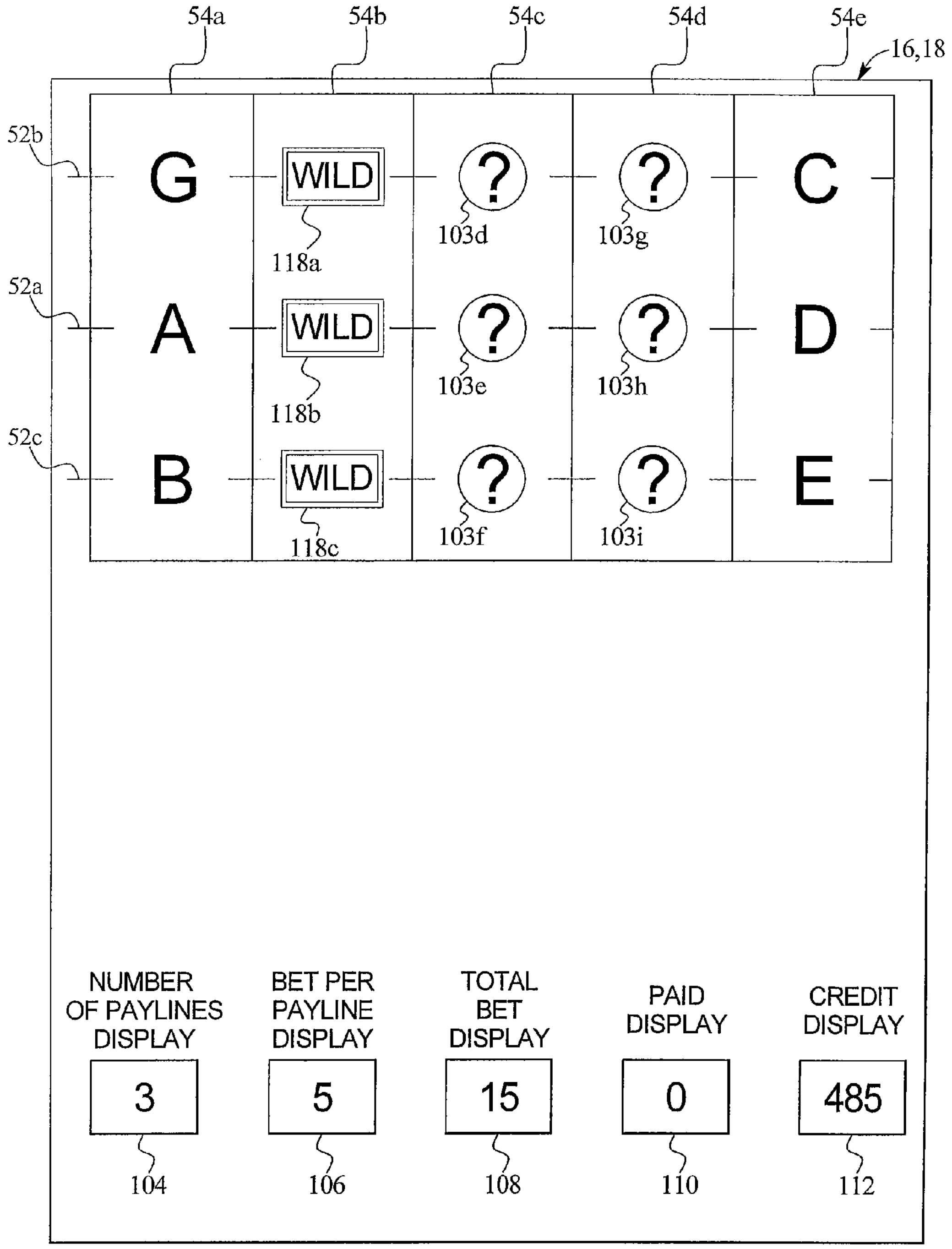

Referring now to FIG. 3E, in the illustrated example, the gaming device converts, transforms or changes all of the symbols displayed by reel 54*b* into wild symbols 113*a*, 113*b* and 113*c*. It should be appreciated that the gaming device may convert or change one, a plurality or all of the symbols to wild symbols. It should also be appreciated that the transformation or conversion of the symbols may be accompanied by sounds and visual effects to highlight the event to the player. The gaming device then enables the player to select or pick one of the selectable symbols 103*d*, 103*e* or 103*f* on reel three or reel 54*c* in the bonus game.

Figure 3F:
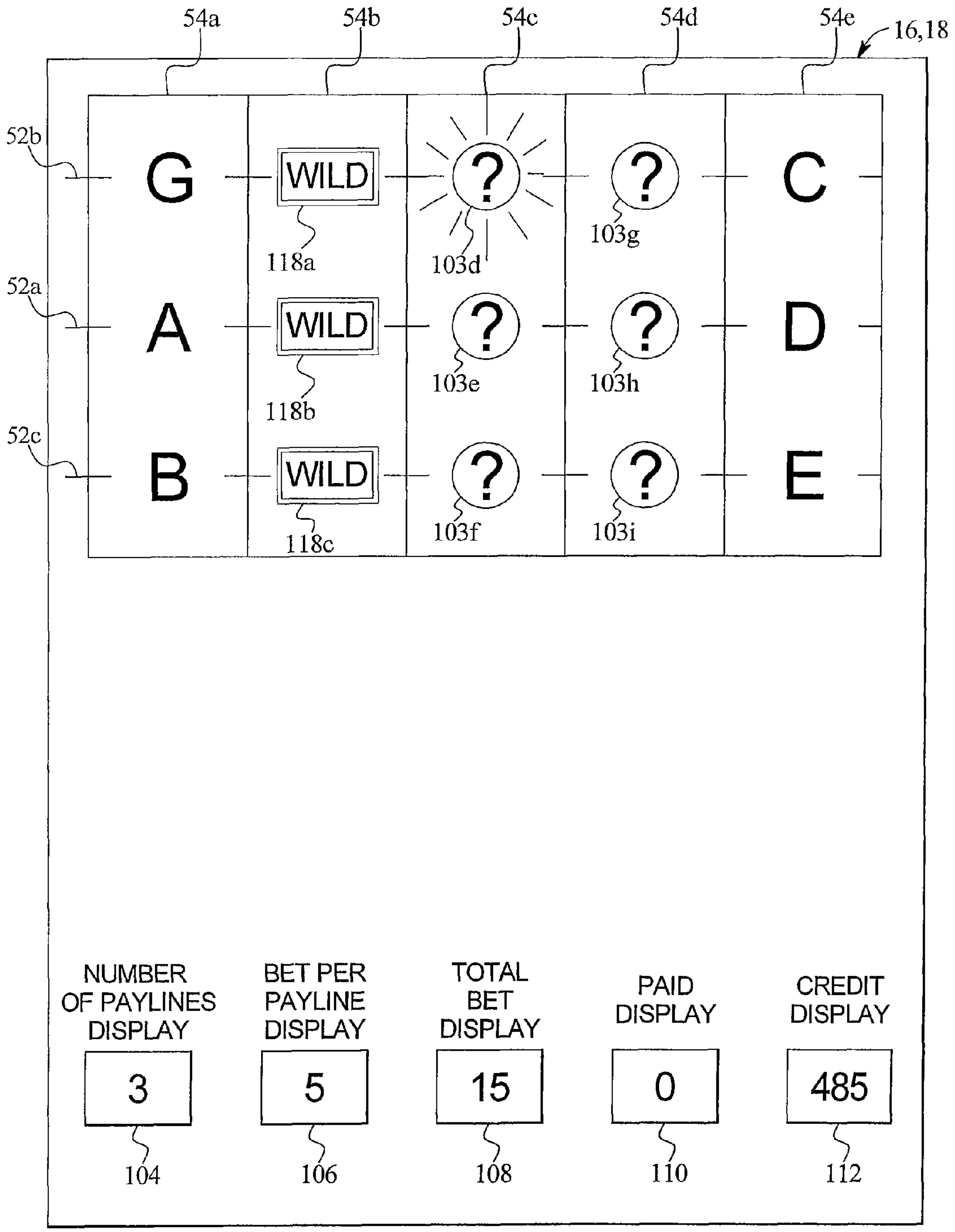
Figure 3G:
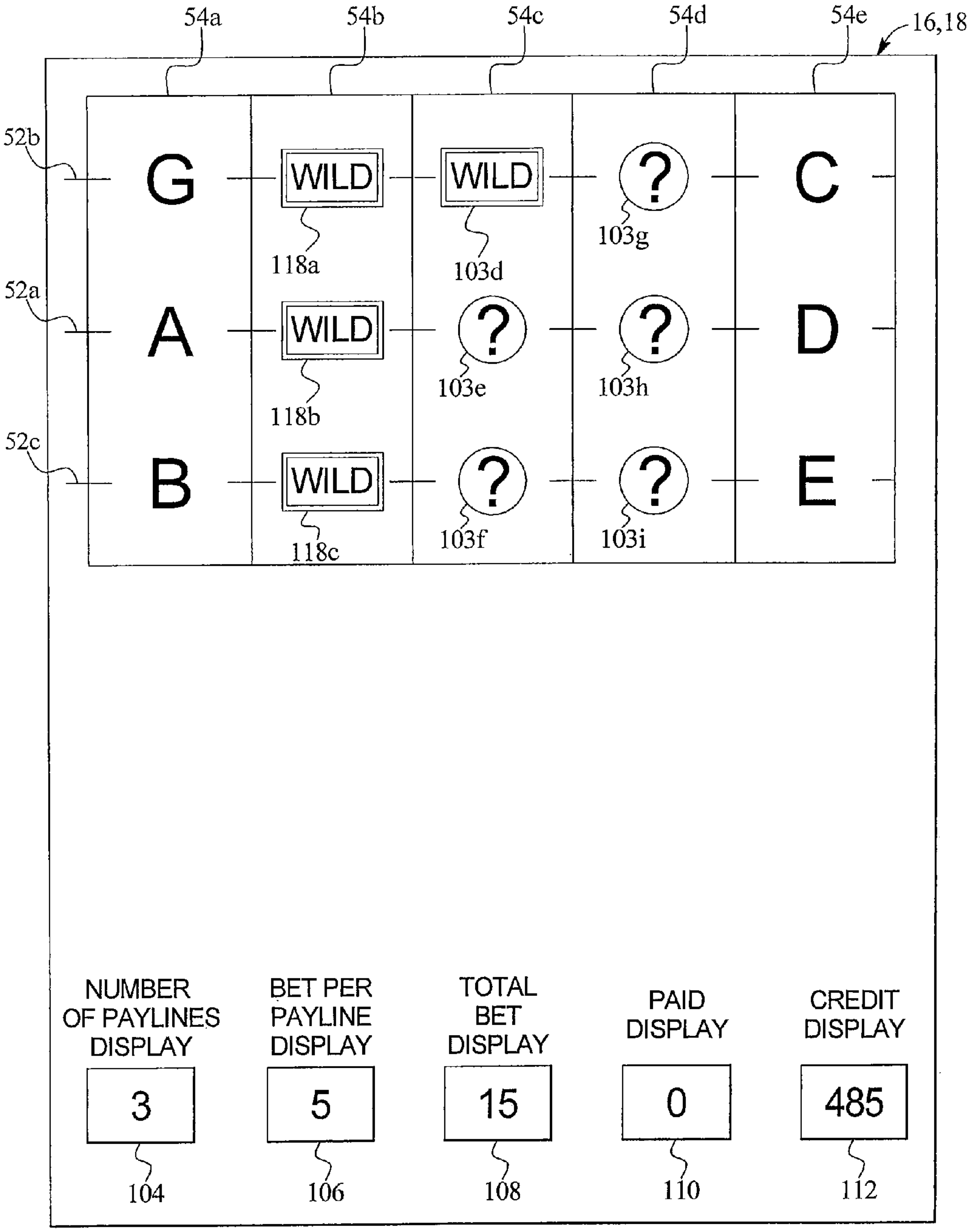

Referring now to FIGS. 3F and 3G, the player selects or picks the selectable symbol or wild guess symbol in the top symbol position of reel 54*c* (i.e., symbol position 3/1) as shown in FIG. 3F. The picked selectable symbol reveals a wild symbol as illustrated in FIG. 3G. The second revealed wild symbol now enables the player to obtain three winning symbol combinations on the reels including three of the same symbols in the bonus game.

Figure 3H:
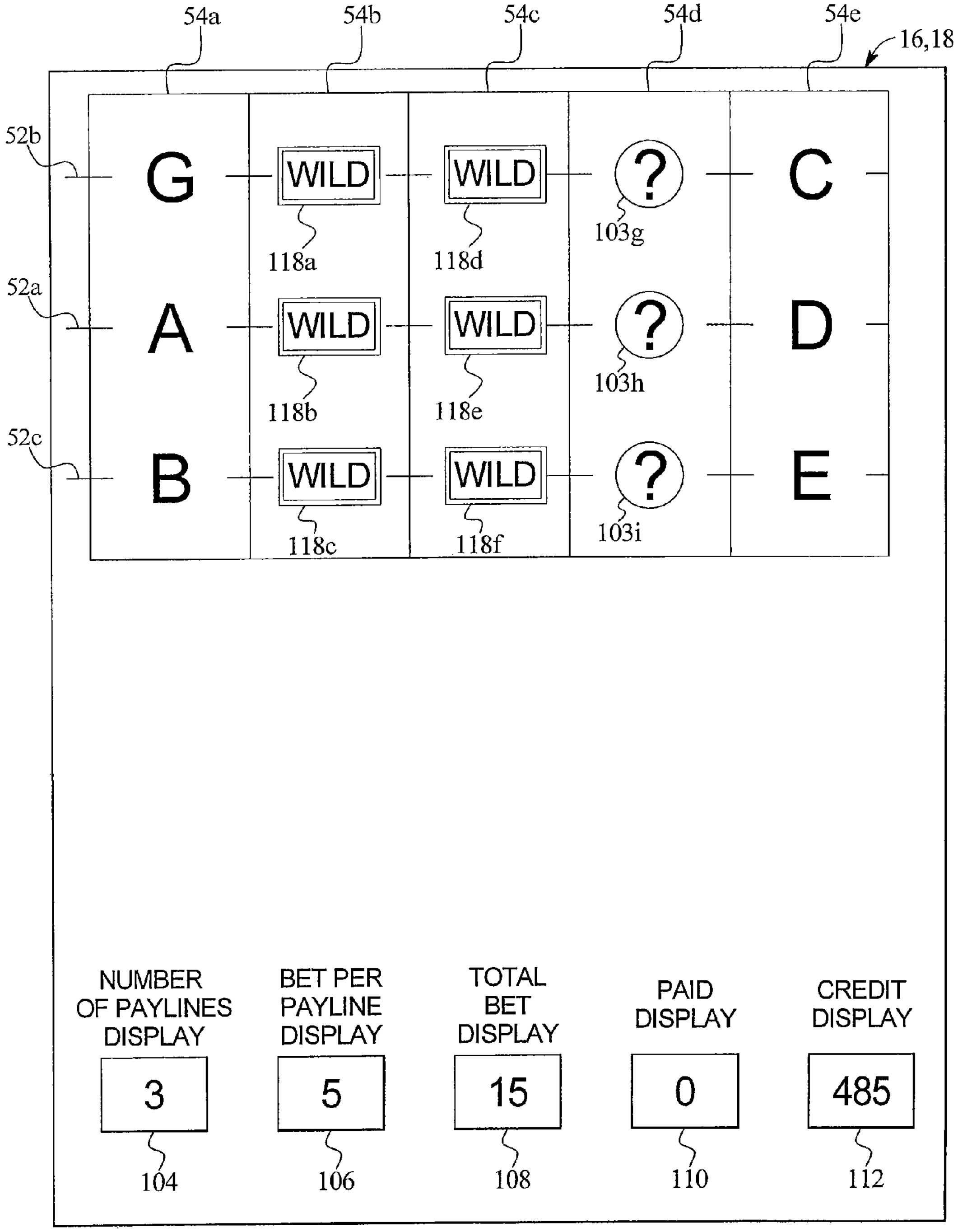

Referring now to FIG. 3H, the gaming device transforms or changes all of the displayed symbols on reel 54*c* to wild symbols 118*d*, 118*e* and 118*f*. Because the player did not pick a selectable symbol that revealed a credit value symbol, the gaming device enables the player to pick one of the selectable symbols 103*g*, 103*h* or 103*i* on reel 54*d* in the bonus game.

Figure 3I:
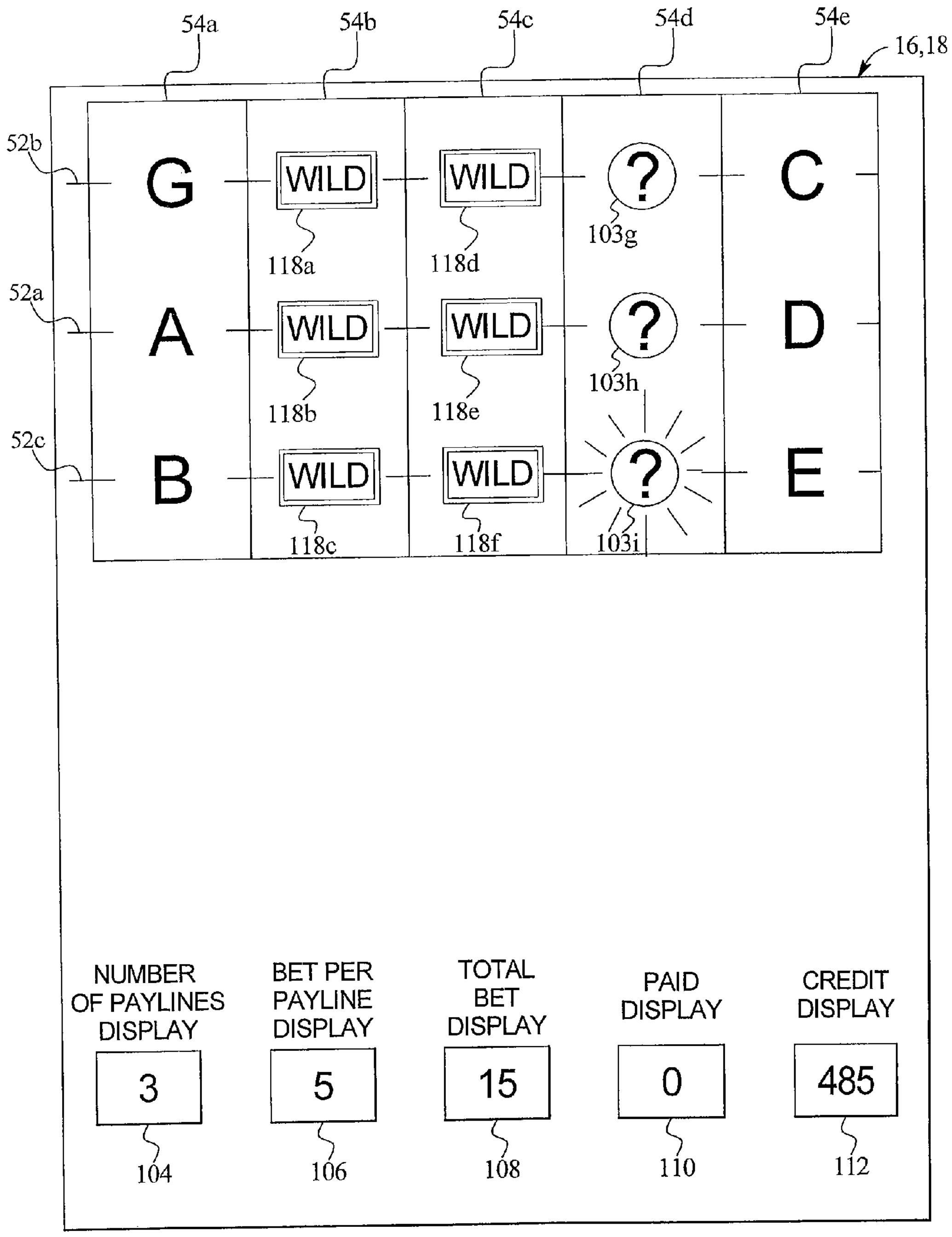
Figure 3J:
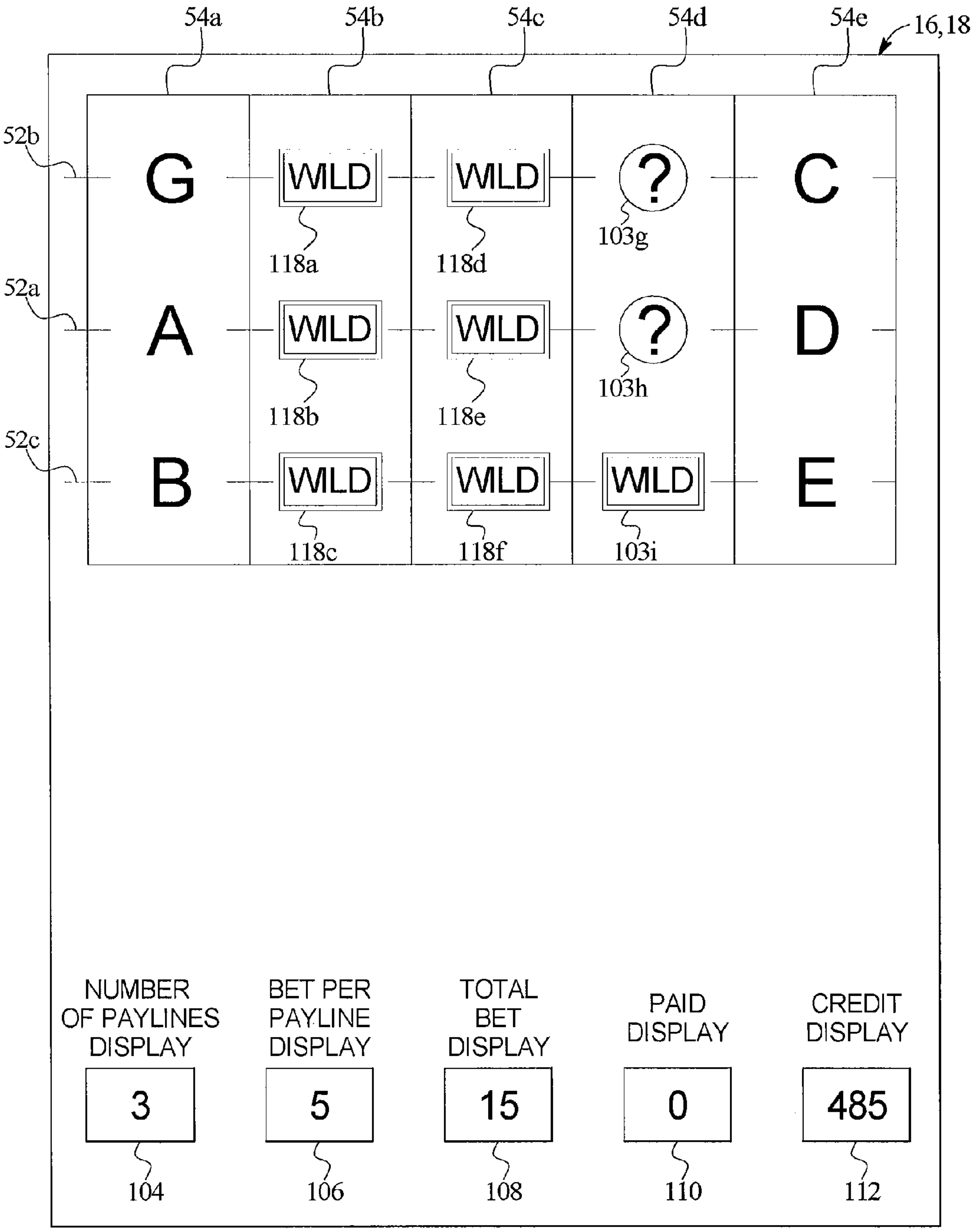

Referring now to FIG. 3I, the player selects or picks selectable symbol or wild guess symbol 113*i* in symbol position 4/3 on reel 54*d* in the bonus game. As illustrated in FIG. 3J, the selected symbol reveals another wild symbol 118*i* in the bonus game.

Figure 3K:
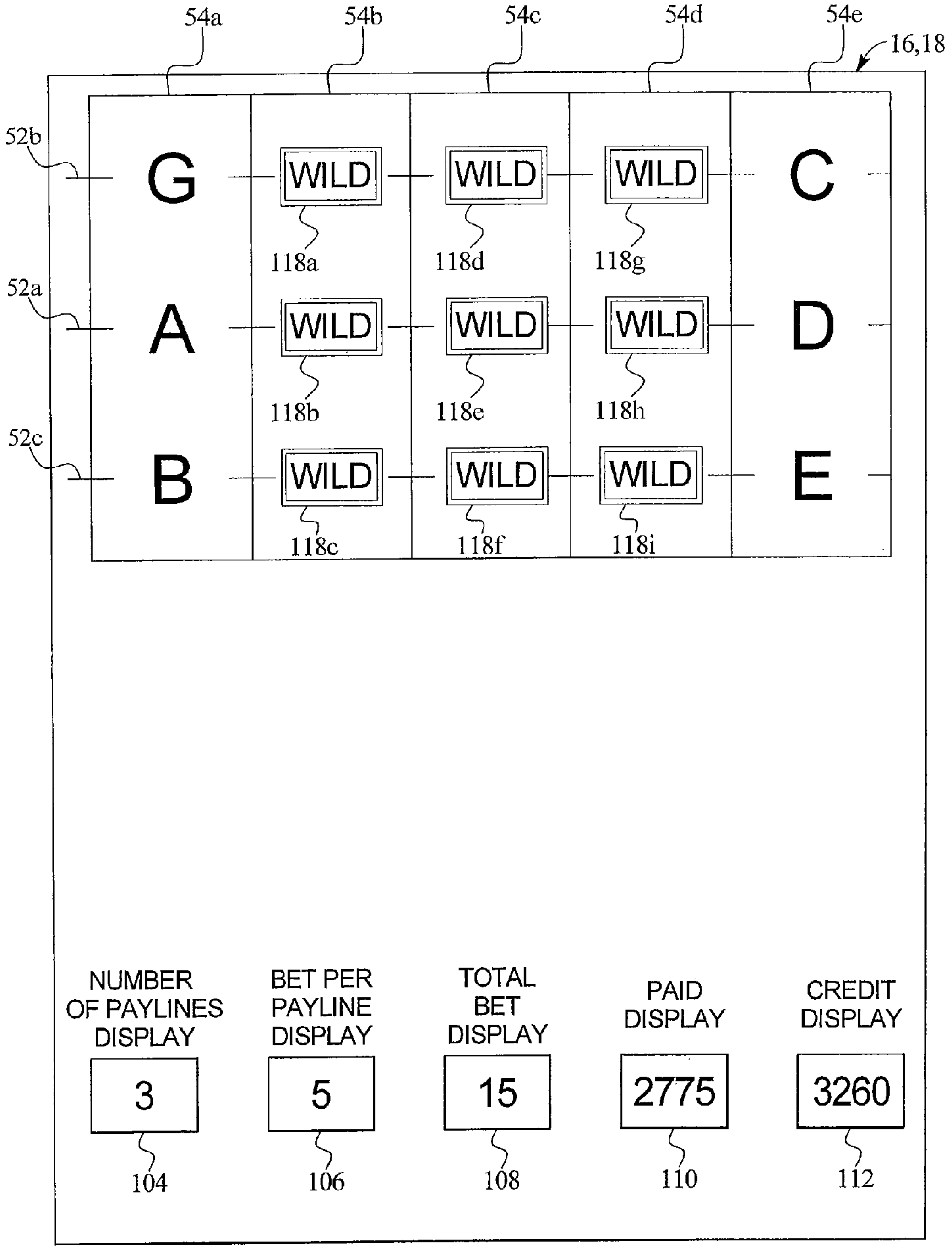

Referring now to FIG. 3K, the gaming device transforms or changes each of the displayed symbols on reel 54*d* to wild symbols 118*g*, 118*h* and 118*i*. All of the symbol positions of reels 54*b*, 54*c* and 54*d* now display wild symbols. The gaming device evaluates the symbol combinations indicated by each of the activated paylines 52*a*, 52*b* and 52*c* in the bonus game. The gaming device then provides the awards associated with any winning symbol combinations indicated by the activated or wagered on paylines 52*a*, 52*b* and 52*c* in the bonus game. Payline 52*a* indicates a symbol combination including the symbol A and three wild symbols 118*b*, 118*e* and 118*h*. As illustrated by the paytable FIG. 3B, a symbol combination including four A symbols (i.e., the displayed A symbol and three more A symbols substituted by the wild symbols) provides an award of eighty credits. Payline 52*b* indicates a winning symbol combination of four G symbols, which provides an award of thirty credits. Payline 52*c* indicates a winning symbol combination including four B symbols which provides an award of seventy-five credits. In this embodiment, the award for each play of the game equals the total bet multiplied by the award in the bonus game. Therefore, the award for the bonus game equals fifteen as indicated by the total bet display 110 multiplied by one hundred eighty-five which is the total award accumulated by the player in the bonus game. The total award for the bonus game is two thousand seven hundred seventy-five as indicated by the paid display 110. The total award or bonus game award is added to the player's total award to provide a new total award of three thousand two hundred sixty as indicated by the credit display 112.

This example illustrates how the selectable symbols or wild guess symbols in the bonus game increase a player's excitement and enjoyment with the game because the player may obtain several additional awards or possibly a relatively large award in the game. The player also can interact with the game by selecting and determining a portion of the symbol combinations and/or awards in the game which also increases the player's excitement and enjoyment with the game.

Figure 4:
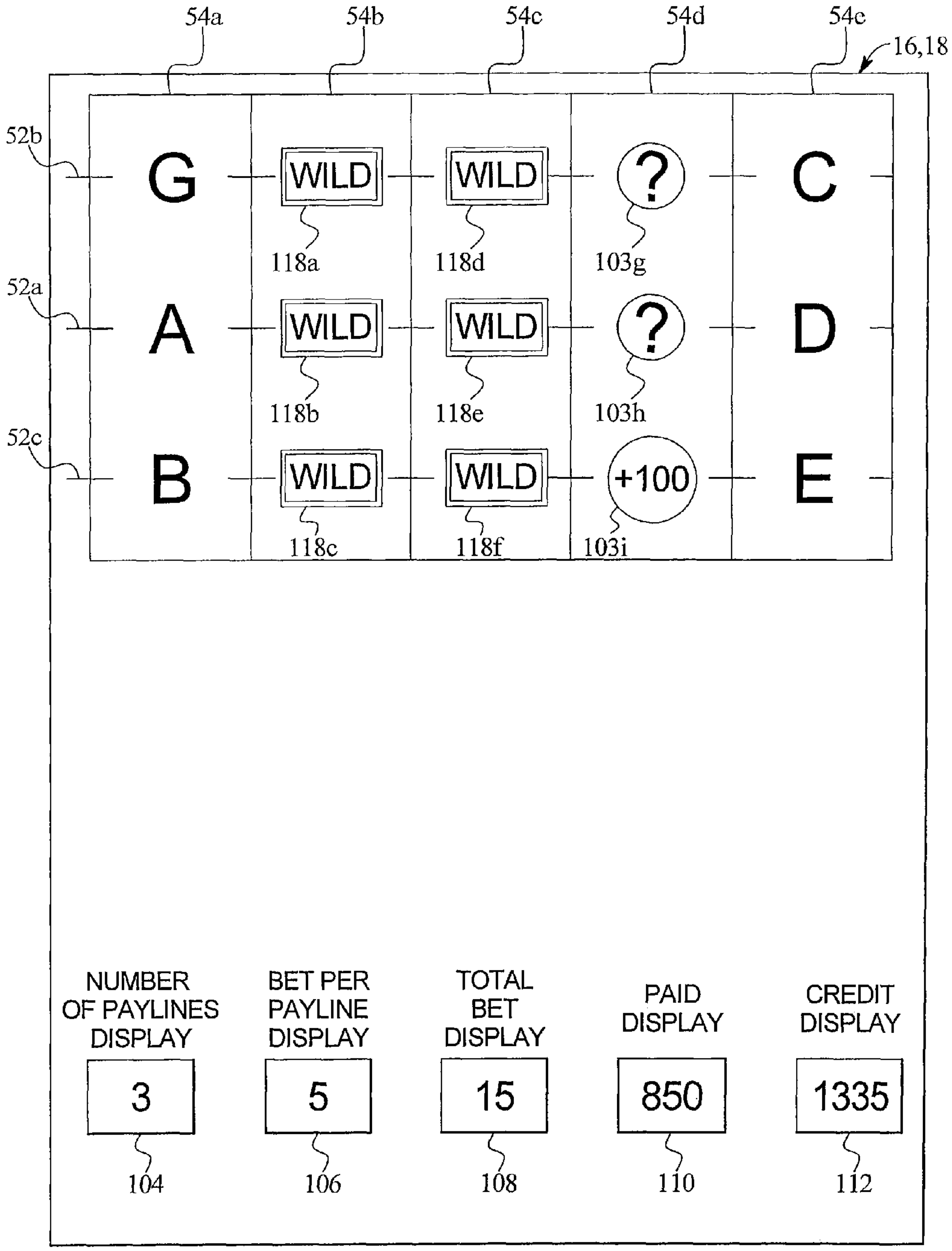
FIG. 4 is an enlarged elevation view of another example of the embodiment of FIG. 3A where the third selectable symbol picked by the player reveals a value symbol.

Referring now to FIG. 4, another example of the above embodiment is illustrated where the player's third decision or pick in the game resulted in a credit value or value symbol 103*i*. The number of credits associated with the value symbol is one hundred. Therefore, the gaming device provides the player with the value or number of credits associated with the value symbol 103*i* plus any awards associated with symbol combinations indicated by the paylines 52*a*, 52*b* and 52*c* in the game. The gaming device also evaluates the symbols indicated by each of the activated or wagered on paylines (i.e., paylines 52*a*, 52*b* and 52*c*) in the bonus game. Payline 52*a* indicates three A symbols (i.e., an A symbol plus two wild symbols which substitute for two A symbols) which provides an award of twenty-five as indicated by paytable 113 in FIG. 3B. Payline 52*b* indicates three G symbols which provides an award of five. Payline 52*c* indicates a symbol combination including three B symbols which provides an award of twenty. The total award provided to the player in this example is the total bet of fifteen multiplied by the total accumulated award of fifty to provide an award of seven hundred fifty. The credit value or value of one hundred is added to this award to provide a total award of eight hundred fifty in the bonus game as indicated by the paid display 110. This award is added to the player's previous total award of four hundred eighty-five to give the player a new total award of one thousand three hundred thirty-five.

Figure 5:
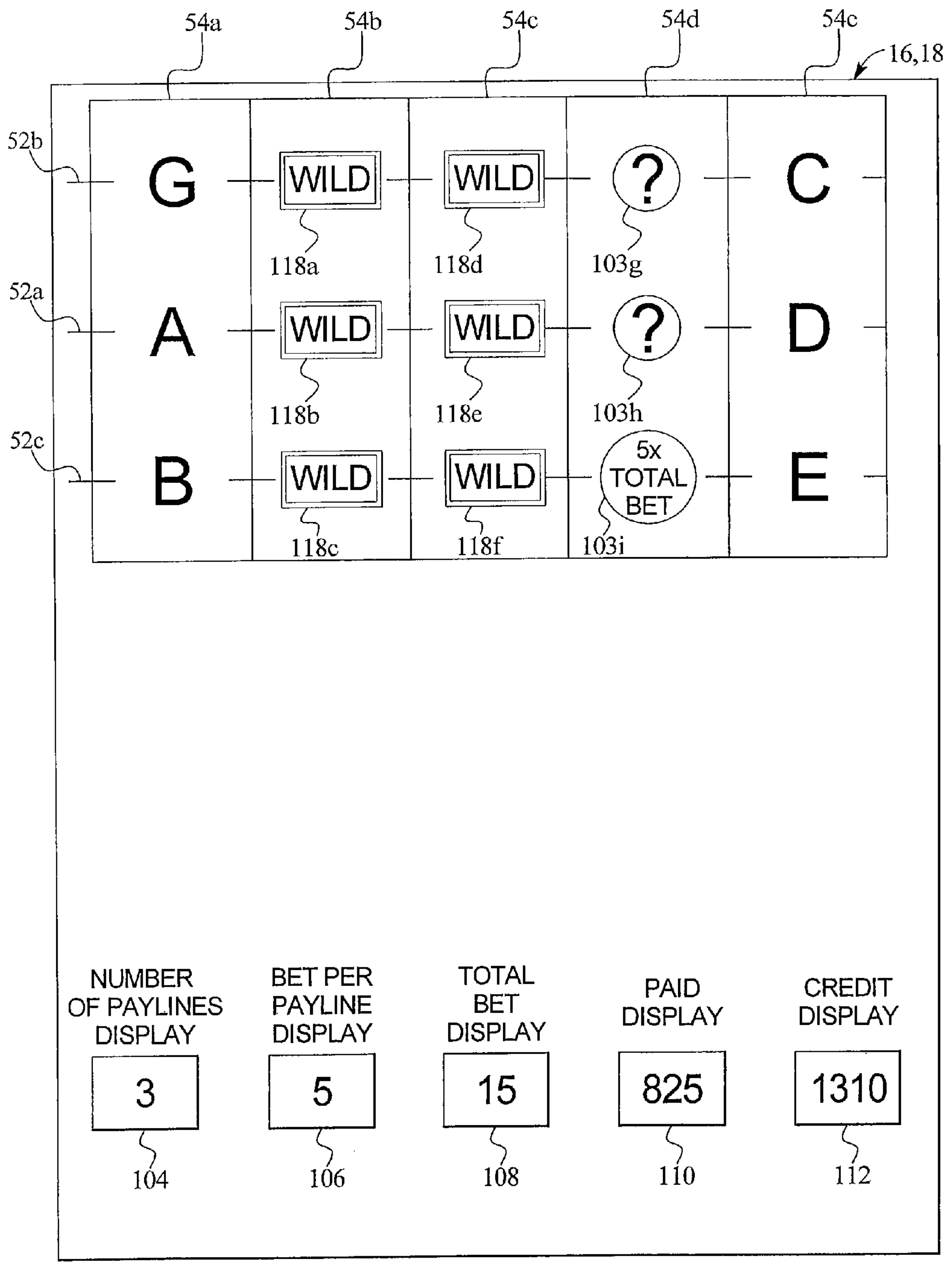
FIG. 5 is an enlarged elevation view of another example of the embodiment of FIG. 3A where the third selectable symbol picked by the player reveals a value symbol based on a wager made by the player.

Referring now to FIG. 5, another example of the above embodiment is illustrated where the credit value or value symbol includes a modifier. In this embodiment, the modifier modifies the player's total bet in the game to provide the value to the player. For example, the credit value or value symbols 103*i* indicates that the value equals 5× the total bet indicated by the total bet display 108. The total bet is fifteen. Therefore, the value of the credit value symbol or value symbol 103*i* is fifteen multiplied by five or seventy-five. This amount is added to the awards associated with the symbol combinations described above, which is fifty multiplied by the total bet of fifteen or seven hundred fifty credits. The total award provided by the bonus game is eight hundred twenty-five as indicated by the paid display 110. The new total award is therefore four hundred eighty-five plus eight hundred twenty-five or one, thousand three hundred ten as indicated by the credit display 112.

Figure 6:
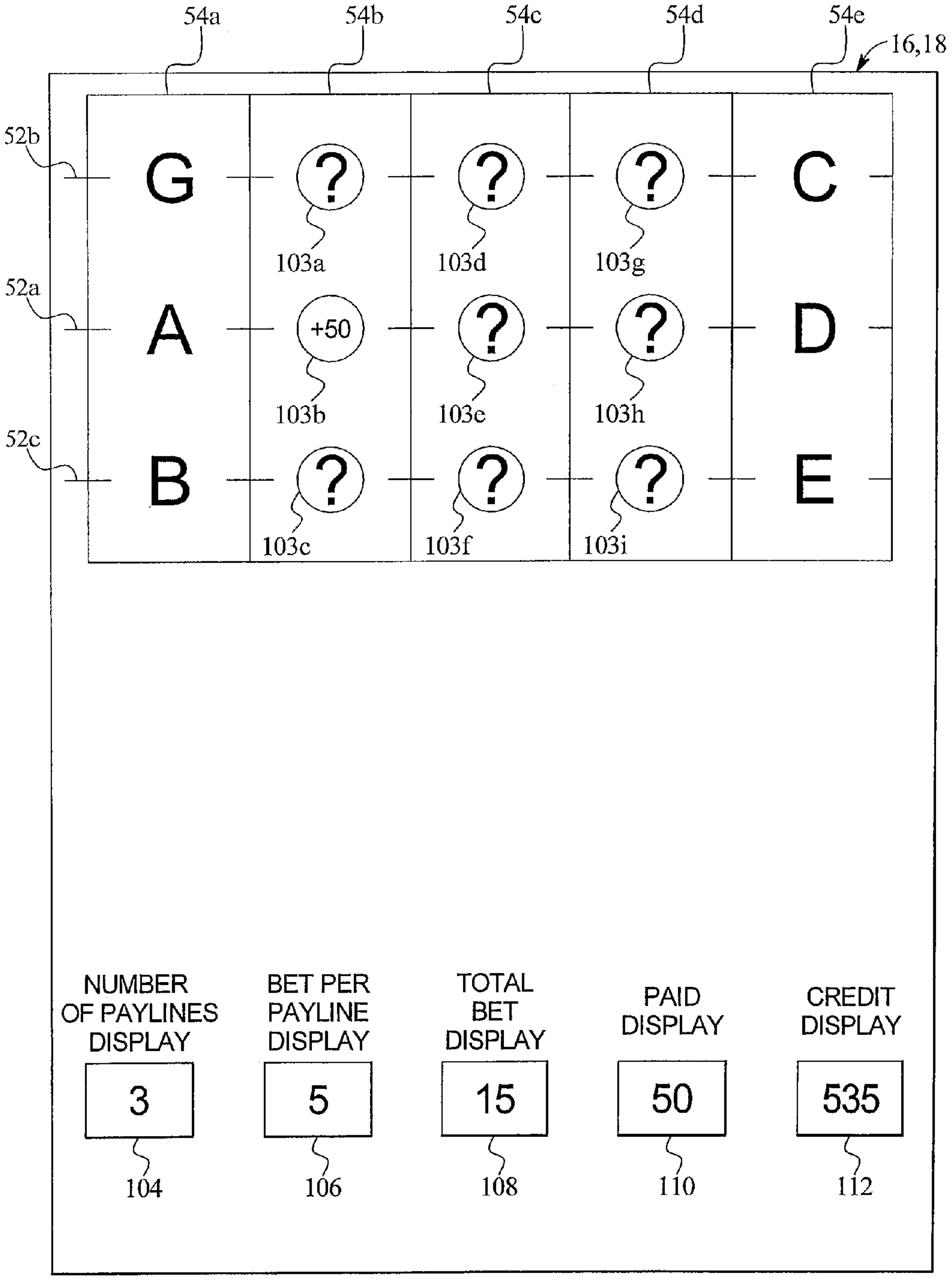
FIG. 6 is an enlarged elevation view of another example of the embodiment of FIG. 3A where the first selectable symbol picked by the player reveals a value symbol.

Referring now to FIG. 6, another example of the above embodiment is illustrated where the player picked or selected the first selectable symbol in the bonus game, which revealed a credit value or value symbol 103*b*. The gaming device provides the value associated with the value symbol 103*b* to the player and then evaluates the symbols indicated by the activated or wagered on paylines 52*a*, 52*b* and 52*c* in the bonus game. None of the activated paylines indicate winning symbol combinations. Therefore, the gaming device provides the player with the value associated with the picked symbol, which is fifty credits as indicated by the paid display 110, and the bonus game ends. The award of fifty credits is also added to the player's previous total award of four hundred eighty-five to provide a new total award of five hundred thirty-five as indicated by the credit display 112.

In any of the above examples, upon completion of the bonus game, the player may continue to play the base game at the same or different wager level, dispense all of the credits by pressing the cash out button, view pay schedules or paytables by pressing the appropriate buttons, and/or view game instructions by pressing a help button.

In one alternative embodiment, the gaming device re-activates one, a plurality or all of the reels in the bonus game after the player has selected or picked one or more of the selectable symbols on the reels in the bonus game. By re-spinning or re-activating one or more of the reels, the gaming device is creating new symbol combinations in the game which may be one or more winning symbol combinations.

In another alternative embodiment, the player may make any suitable type of decision, including making one or more selections from a group of objects. For example, selecting symbol positions and revealing wild symbols until a selection reveals an end of game indicator or terminator symbol. In another embodiment, the gaming device presents one or more questions and the player provides one or more answers to the questions, problems and/or riddles such as answering a trivia question by selecting an answer from a list provided by the gaming device or machine. The gaming device may also enable the player to take actions to complete one or more required activities. For example, the gaming device includes a plastic hammer and enables the player to use the plastic hammer to tap or contact plastic gophers on the head as the gophers pop out of holes in the cabinet of the gaming device.

In another alternative embodiment, the gaming device enables the player to make any suitable number of decisions, including making one or more different decisions or making one or more decisions from a plurality of different decision types. For example, answering two trivia questions and attempting to tap three gopher heads in a game. The gaming device may also enable the player to make one or more decisions based upon a triggering event. For example, making one decision for each trigger symbol appearing on the reels.

In another alternative embodiment, the gaming device enables the player to make decisions until deciding to stop. For example, selecting symbols on the reels until deciding to stop to avoid revealing a symbol that decreases an outcome or award in a game. In another embodiment, the gaming device enables the player to make decisions until selecting a termination object such as a terminator symbol or terminator. For example, the gaming device enables the player to select symbol positions until revealing a "2×" symbol that doubles the value of all outcomes or awards.

In another alternative embodiment, the gaming device enables the player to indicate decisions in any suitable manner, such as indicating decisions by audio. For example, the gaming device enables a player to answer a historical trivia question by saying "Answer A" or "The Queen of England." The player may also indicate their decisions by using a mechanical device such as a laser pointer, light pen, computer mouse, or even a plastic hammer to select symbol positions in the symbol matrix. The player may also indicate decisions by performing some action such as touching the display screen to indicate a symbol position or inserting more coins in the machine to select an option displayed or otherwise associated with the gaming device.

In a further alternative embodiment, the player's decisions may be triggered using any suitable method, including triggering decisions based upon symbols appearing on the reels. For example, a pre-determined combination of symbols appearing on a pay line triggers decisions to be made by a player. In another embodiment, the gaming device triggers decisions to be made by the player after a random or designated number of spins and/or based upon the result of spins. For example, the decisions are triggered after every spin or only after ten consecutive losing spins. The decisions may also be triggered based upon the amount or type of wager. For example, one decision for each fifty credits wagered by the player on the base game or on a separate game from the base game. The decisions may also be triggered upon the results of prior decisions. For example, a player may gain or lose additional decision opportunities based upon the results of one or more previous decisions by the player. The decisions may also be triggered at random. For example, a random number generator that triggers a decision upon the generation of a prime number or other suitable number.

In another alternative embodiment, the player's decisions result in any type of wild symbols, including wild symbols that replace any other symbol on the reels. For example, a wild symbol that replaces all line pay and scatter pay symbols. In another embodiment, the wild symbols replace a sub-set of symbols. For example, a wild symbol that only replaces half of the line pay symbols. In a further embodiment, the wild symbols increase or decrease the value of any outcomes or awards in a game. For example, a wild symbol that doubles the value of all line pay outcomes or awards in a game.

In a further alternative embodiment, the player's decisions result in any number of wild symbols, including a designated or limited number of wild symbols. For example, a player's decision may generate up to but no more than nine wild symbols in a play of a game. In another embodiment, the player's decision generates an unlimited number of wild symbols. For example, the player's decision may generate more wild symbols than symbol positions associated with the reels, where extra wild symbols are reserved for use in subsequent spins of the reels.

In another alternative embodiment, the player's decisions result in wild symbols being displayed in any symbol position on the reels. In another embodiment, the wild symbols are displayed in a limited area or in specific symbol positions associated with the reels. For example, wild symbols may only appear in the first and last columns or on the first and last reels of a set of reels. In a further embodiment, the wild symbols are fixed in the position in which the wild symbols appear on the reels. For example, a wild symbol in the top row of reel two must remain in that symbol position. The wild symbols may also move from symbol positions in which they appear to one or more other symbol positions. For example, a wild symbol in the top row of reel two may move to the bottom row of reel four in a set of five reels.

In another alternative embodiment, the player's decisions result in any duration of wild symbols, including wild symbols that last for more than one spin or activation of the reels. For example, a wild symbol remains on the reels for three spins of the reels. In another embodiment, the wild symbols only last for one or more pay outs to a player. For example, a wild symbol helps form a line pay and disappears, even if that wild symbol could also help form a different line pay in a play of a game. In another embodiment, the wild symbols last for a random or designated amount of time. For example, a wild symbol may last for five minutes regardless of the number of spins of the reels during that time period.

In a further alternative embodiment, the player's decisions result in any suitable outcomes or awards such as a number of credits, prizes (i.e., a car or a cruise) or free games (i.e., ten free spins). The outcomes or awards may affect the value of other awards. For example, an award that doubles the value of other awards issued during the next ten spins of the reels.

In a further alternative embodiment, the outcomes or awards may be any suitable outcome or award based on a player's decision. For example, the player's decisions result in any suitable amount of awards, including any amount of the award type described above such as an award of one million credits to a player.

In another alternative embodiment, the player's decisions result in any number of awards, including any number of award types described above. For example, an outcome or award including a combination of one hundred credits, seven free spins, and a brand new car.

In a further alternative embodiment, the player's decisions result in awards at any point in time in a game, including outcomes or awards issued after one or more decisions by a player. For example, outcomes or awards may issue after every two decisions by a player. In another embodiment, the outcomes or awards are issued between decisions by a player. For example, the outcomes or awards are issued between a first and second decision by a player in a game. In another embodiment, the outcomes or awards are issued or provided to a player following all decisions by a player in a game. For example, the outcomes or awards are issued after every decision has been made by a player in a game. In a further embodiment, the gaming device provides different types of outcomes or awards at different times in a game. For example, prizes or awards may be provided to a player instantly but free spin awards may issue following all decisions made by the player.

In another alternative embodiment, at least one of the selectable symbols includes a wild symbol or a value symbol which splits into two or more identical symbols. For example, a wild symbol associated with the selectable symbol splits into two identical wild symbols after the selectable symbol is picked by a player. As a result, the additional wild symbols enhance the symbol combination indicated by a payline in a game. In another example, if a value symbol is associated with the picked selectable symbol, the value symbol splits into two identical symbols each providing an identical number of credits to the player. The player therefore receives additional credits in the game. It should be appreciated that one or more of the selectable symbols in a game may include a wild symbol or a value symbol which splits into two or more identical symbols. It should also be appreciated that the wild symbol or value symbol described above may split into a designated number of identical symbols, a randomly determined number of identical symbols or a number of identical symbols determined by a wager made by a player. It should further be appreciated that the value symbol may split into one or more different value symbols (i.e., a value symbol that provides fifty credits and, a value symbol that provides one hundred credits). It should also be appreciated that the wild symbol or value symbol may split before (i.e., the wild symbol or value symbol splits and the split symbols are revealed after the player picks the selectable symbol) or after the selectable symbol including the splitting wild symbol or value symbol is picked by the player.

In a further alternative embodiment, one or more of the reels split into two or more identical reels before or after the player picks one of the selectable symbols on the reels. For example, after the player picks one of the selectable symbols on the reels, the reel including the picked selectable symbol reveals the wild symbol or value symbol associated with the picked selectable symbol and splits into two identical reels. The gaming device therefore displays an additional reel. The additional reel provides additional symbols and thereby an enhanced symbol combination in the game. It should be appreciated that one, a plurality or all of the reels may split into two or more identical reels in a game. It should also be appreciated that the reels may split into a designated number of identical reels, a randomly determined number of identical reels or a number of identical reels determined by a wager made by a player. It should further be appreciated that one, a plurality or all of the split reels may be different reels in a game (i.e., display one or more different symbols).

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The application is claimed as follows:

1. A gaming system comprising:

at least one input device;

at least one display device;

at least one processor; and at least one memory device storing a plurality of instructions which, when executed by the at least one processor, cause the at least one processor to operate with the at least one input device and the at least one display device, for a play of a game operable upon a wager by a player, to:

(i) display a plurality of reels, each said reel associated with a plurality of symbol display areas;

(ii) for each reel, randomly generate and cause said reel to display one of a plurality of different symbols on said reel at each of the plurality of symbol display areas associated with said reel;

(iii) determine if a triggering event occurs for said play of the game; and (iv) if the triggering event occurs:

(a) for one of the symbol display areas, display at said symbol display area two of the same symbol which is displayed at said symbol display area;

(b) evaluate the symbols displayed at each of the symbol display areas, including the symbol display area at which two of the same symbol are displayed, to determine if any winning symbol combinations are displayed; and (c) provide the player any awards associated with any displayed winning symbol combinations.

2. The gaming system of claim 1, wherein the plurality of instructions, when executed by the at least one processor, cause the at least one processor to operate with the at least one input device and the at least one display device to enable the player to select one of the symbol display areas.

3. The gaming system of claim 2, wherein the plurality of instructions, when executed by the at least one processor, cause the at least one processor to operate with the at least one display device to display said two same symbols at the selected symbol display area.

4. The gaming system of claim 2, wherein the triggering event is a selection of one of the symbol display areas.

5. The gaming system of claim 4, wherein the plurality of instructions, when executed by the at least one processor, cause the at least one processor to operate with the at least one display device to display said two same symbols at the selected symbol display area.

6. The gaming system of claim 1, wherein said two same symbols are value symbols.

7. The gaming system of claim 1, wherein said two same symbols are wild symbols.

8. The gaming system of claim 1, wherein the plurality of instructions, when executed by the at least one processor, cause the at least one processor to operate with the at least one input device and the at least one display device to, if the triggering event occurs, for each of a plurality of the symbol display areas, display at said symbol display area two of the same symbols which is displayed at said symbol display area.

9. The gaming system of claim 1, wherein the plurality of instructions, when executed by the at least one processor, cause the at least one processor to operate with the at least one input device and the at least one display device to enable the player to select a plurality of the symbol display areas.

10. The gaming system of claim 9, wherein the plurality of instructions, when executed by the at least one processor, cause the at least one processor to operate with the at least one input device and the at least one display device to, if the triggering event occurs, for each of said selected plurality of the symbol display areas, display at said symbol display area two of the same symbols which is displayed at said symbol display area.

11. A gaming system comprising:

at least one input device;

at least one display device;

at least one processor; and at least one memory device storing a plurality of instructions which, when executed by the at least one processor, cause the at least one processor to operate with the at least one input device and the at least one display device, for a play of a game operable upon a wager by a player, to:

(i) display a plurality of reels, each reel associated with a plurality of symbol display areas;

(ii) for each reel, randomly generate and display one of a plurality of different symbols on the reel at each of the plurality of symbol display areas associated with said reel;

(iii) determine if a triggering event occurs for the play of the game; and (iv) if the triggering event occurs:

(a) cause a display of a duplicate of one of the reels such that the plurality of reels include two of the duplicated reel;

(b) evaluate the symbols displayed at each of the symbol display areas associated with each of the reels, including both duplicate reels, to determine if any winning symbol combinations are displayed; and (c) provide the player any awards associated with any displayed winning symbol combinations.

12. The gaming system of claim 11, wherein the plurality of instructions, when executed by the at least one processor, cause the at least one processor to operate with the at least one input device and the at least one display device to, if the triggering event occurs, for each of a plurality of the reels, cause a display of a duplicate of said reel such that the plurality of reels include two of the duplicated reel.

13. A method of operating a gaming system including at least one input device, at least one display device and at least one processor, the method comprising:

(i) displaying a plurality of reels via the at least one display device, each said reel associated with a plurality of symbol display areas;

(ii) for each reel, the at least one processor operating with the display device to randomly generate and cause said reel to display one of a plurality of different symbols on said reel at each of the plurality of symbol display areas associated with said reel;

(iii) the at least one processor determining if a triggering event occurs for said play of the game; and (iv) if the triggering event occurs:

(a) for one of the symbol display areas, the at least one display device displaying at said symbol display area two of the same symbol which is displayed at said symbol display area;

(b) the at least one processor evaluating the symbols displayed at each of the symbol display areas, including the symbol display area at which two of the same symbol are displayed, to determine if any winning symbol combinations are displayed; and (c) providing a player any awards associated with any displayed winning symbol combinations.

14. The method of claim 13, which includes enabling the player to select one of the symbol display areas via the at least one input device.

15. The method of claim 14, which includes the at least one display device displaying said two same symbols at the selected symbol display area.

16. The method of claim 14, wherein the triggering event is a selection of one of the symbol display areas.

17. The method of claim 16, which includes the at least one display device displaying said two same symbols at the selected symbol display area.

18. The method of claim 13, wherein said two same symbols are value symbols.

19. The method of claim 13, wherein said two same symbols are wild symbols.

20. The method of claim 13, which includes if the triggering event occurs, for each of a plurality of the symbol display areas, the at least one display device displaying at said symbol display area two of the same symbols which is displayed at said symbol display area.

21. The method of claim 13, which includes enabling the player to select a plurality of the symbol display areas via the at least one input device.

22. The method of claim 21 which includes if the triggering event occurs, for each of said selected plurality of the symbol display areas, causing the at least one display device to display at said symbol display area two of the same symbol which is displayed at said symbol display area.

23. A method of operating a gaming system including at least one input device, at least one display device and at least one processor, the method comprising:

(i) displaying a plurality of reels via the at least one display device, each reel associated with a plurality of symbol display areas;

(ii) for each reel, the at least one processor operating with the at least one display device to randomly generate and display one of a plurality of different symbols on the reel at each of the plurality of symbol display areas associated with said reel;

(iii) the at least one processor determine if a triggering event occurs for the play of the game; and (iv) if the triggering event occurs:

(a) the at least one display device displaying of a duplicate of one of the reels such that the plurality of reels include two of the duplicated reel;

(b) the at least one processor evaluating the symbols displayed at each of the symbol display areas associated with each of the reels, including both duplicate reels, to determine if any winning symbol combinations are displayed; and (c) providing a player any awards associated with any displayed winning symbol combinations.

24. The method of claim 23, which includes if the triggering event occurs, for each of a plurality of the reels, the at least one display device displaying a duplicate of said reel such that the plurality of reels include two of the duplicated reel.

* * * * *

UNITED STATES PATENT AND TRADEMARK OFFICE
CERTIFICATE OF CORRECTION

PATENT NO. : 8,382,574 B2
APPLICATION NO. : 12/817931
DATED : February 26, 2013
INVENTOR(S) : Daniel M. Marks et al.

It is certified that error appears in the above-identified patent and that said Letters Patent is hereby corrected as shown below:

IN THE CLAIMS

In Claim 8, Column 20, Line 11, replace “symbols” with --symbol--.
In Claim 10, Column 20, Line 23, replace “symbols” with --symbol--.
In Claim 20, Column 21, Line 36, replace “symbols” with --symbol--.
In Claim 23, Column 22, Line 20, replace “determine” with --determining--.
In Claim 23, Column 22, Line 23, delete “of”.

Signed and Sealed this
Seventh Day of May, 2013

Teresa Stanek Rea
*Acting Director of the United States Patent and Trademark Office*